(12) United States Patent
Lu et al.

(10) Patent No.: US 12,273,578 B2
(45) Date of Patent: Apr. 8, 2025

(54) DISPLAY APPARATUS AND PROCESSING METHOD

(71) Applicant: HISENSE VISUAL TECHNOLOGY CO., LTD., Shandong (CN)

(72) Inventors: Pingguang Lu, Shandong (CN); Junning Chen, Shandong (CN); Yinghao He, Shandong (CN); Ruiji Zhang, Shandong (CN); Tingfu Xie, Shandong (CN); Hao Wang, Shandong (CN); Fang Liu, Shandong (CN); Yanli Wu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 111 days.

(21) Appl. No.: 18/340,512

(22) Filed: Jun. 23, 2023

(65) Prior Publication Data

US 2023/0336806 A1 Oct. 19, 2023

Related U.S. Application Data

(63) Continuation of application No. PCT/CN2022/071780, filed on Jan. 13, 2022.

(30) Foreign Application Priority Data

Jan. 14, 2021 (CN) .......................... 202110046140.2
Mar. 18, 2021 (CN) .......................... 202110291958.0
(Continued)

(51) Int. Cl.
*H04N 21/41* (2011.01)
*H04N 21/4363* (2011.01)
*H04N 21/462* (2011.01)

(52) U.S. Cl.
CPC ... *H04N 21/4104* (2013.01); *H04N 21/43635* (2013.01); *H04N 21/462* (2013.01)

(58) Field of Classification Search
CPC ...... G06F 3/0481; G06F 3/0484; G06F 9/451; G06F 16/74; H04N 17/00; H04N 21/4104;
(Continued)

(56) References Cited

U.S. PATENT DOCUMENTS

2003/0191863 A1  10/2003  Greenblat
2007/0287495 A1  12/2007  Takuma
(Continued)

FOREIGN PATENT DOCUMENTS

CN  103577175 A  2/2014
CN  104363496 A  2/2015
(Continued)

OTHER PUBLICATIONS

International Search Report, mailed Apr. 13, 2022, from PCT/CN2022/071780.
(Continued)

*Primary Examiner* — Ilwoo Park
(74) *Attorney, Agent, or Firm* — Workman Nydegger

(57) ABSTRACT

Disclosed in the present application are a display apparatus and a processing method. According to the method, a data stream from the external device in connection with the display apparatus is received; a device information frame in the data stream is obtained, where the device information frame is a data frame generated by the external device according to a basic transmission protocol between the external device and the display apparatus; marker bits in the device information frame are traversed; in response to the external device supporting the automatic control protocol, a play mode is switched according to usage scenario infor-
(Continued)

mation added in the data stream; and in response to the external device not supporting the automatic control protocol, a play mode is switched according to a device type of the external device.

18 Claims, 23 Drawing Sheets

(30) Foreign Application Priority Data

Mar. 18, 2021 (CN) .......................... 202110292422.0
Mar. 18, 2021 (CN) .......................... 202110292449.X

(58) Field of Classification Search
CPC ......... H04N 21/4363; H04N 21/43635; H04N 21/44227; H04N 21/4518; H04N 21/462
USPC ................. 710/8, 11, 14; 715/718, 719, 722
See application file for complete search history.

(56) References Cited

U.S. PATENT DOCUMENTS

| | | | |
|---|---|---|---|
| 2011/0285818 A1* | 11/2011 | Park | H04N 13/161 348/43 |
| 2015/0052253 A1 | 2/2015 | Johnson et al. | |
| 2016/0088345 A1 | 3/2016 | Huang | |
| 2018/0004383 A1* | 1/2018 | Iwami | G06F 3/0487 |
| 2019/0253742 A1 | 8/2019 | Garten et al. | |
| 2020/0092594 A1 | 3/2020 | Kasai et al. | |
| 2022/0060669 A1* | 2/2022 | Komiyama | H04N 9/3141 |

FOREIGN PATENT DOCUMENTS

| | | |
|---|---|---|
| CN | 104378688 A | 2/2015 |
| CN | 105025382 A | 11/2015 |
| CN | 105302518 A | 2/2016 |
| CN | 105323386 A | 2/2016 |
| CN | 105430519 A | 3/2016 |
| CN | 106851169 A | 6/2017 |
| CN | 108924592 A | 11/2018 |
| CN | 109495761 A | 3/2019 |
| EP | 1675343 A1 | 6/2006 |
| EP | 3637225 A1 | 4/2020 |
| WO | 2020056734 A1 | 3/2020 |
| WO | 2020233295 A1 | 11/2020 |

OTHER PUBLICATIONS

Chinese First Office Action, mailed Aug. 17, 2022, from Chinese Pat. App. No. 202110292422.0.
Chinese Second Office Action, mailed Mar. 15, 2023, from Chinese Pat. App. No. 202110292422.0.
Chinese First Office Action, mailed Aug. 1, 2022, from Chinese Pat. App. No. 202110292449.X.

* cited by examiner

DISPLAY APPARATUS AND PROCESSING METHOD

CROSS REFERENCE TO RELATED APPLICATIONS

This application is a continuation of International Application No. PCT/CN2022/071780, filed on Jan. 13, 2022, which claims priorities to the Chinese patent application No. 202110046140.2 filed on Jan. 14, 2021, the Chinese patent application No. 202110292422.0 filed on Mar. 18, 2021, the Chinese patent application No. 202110292449.X filed on Mar. 18, 2021 and the Chinese patent application No. 202110291958.0 filed on Mar. 18, 2021, the entire contents of which are incorporated herein by reference.

FIELD

The present application relates to a display technology, in particular to a display apparatus and a processing method for the display apparatus.

BACKGROUND

A smart television may be connected with a gaming device via a high definition multimedia interface (HDMI), and in the process of using the gaming device, the gaming device may output video data and audio data by running game-related programs. The video data and the audio data may be sent to the smart television according to HDMI protocol and output through a screen and a loudspeaker of the smart television, so that video and audio from the gaming device are played.

In the process of playing the video data and the audio data via the smart television, the user may further control the smart television through a control device such as a remote control. For example, the user may call out a control menu of the smart television through a menu key on the remote control, to control display brightness, contrast and an image quality processing program in the smart television through the control menu.

SUMMARY

In a first aspect, the present application provides a display apparatus, including a display, one or more external device interfaces, a memory and at least one processor. The one or more external device interfaces are configured to be connected with one or more external devices, the display is configured to display an image and/or a user interface and display media resource data pictures from the external device, and the memory is configured to store instructions and data associated with the display. The at least one processor is configured to execute the instructions to cause the display apparatus to: receive a data stream from the external device in connection with the display apparatus; obtain a device information frame in the data stream, where the device information frame is a data frame generated by the external device according to a basic transmission protocol between the external device and the display apparatus; traverse marker bits in the device information frame; where a state value of a specified marker bit in the marker bits indicates whether the external device supports an automatic control protocol between the external device and the display apparatus; in response to the external device supporting the automatic control protocol, switch a play mode according to usage scenario information added in the data stream; where the automatic control protocol is configured to transmit a control instruction indicating that the external device actively controls the display apparatus to switch the play mode; and in response to the external device not supporting the automatic control protocol, switch a play mode according to a device type of the external device.

In some embodiments, the play mode includes a low-latency mode (LLM) and a high image quality mode (HIQM).

In some embodiments, the at least one processor is further configured to execute the instructions to cause the display apparatus to: in response to the external device supporting the automatic control protocol, read an auto low-latency mode (ALLM) state parameter from the data stream; in response to the ALLM state parameter being a first value, switch the play mode to the LLM; and in response to the ALLM state parameter being a second value that is different from the first value, switch the play mode to the HIQM.

In some embodiments, the at least one processor is further configured to execute the instructions to cause the display apparatus to: in response to the external device supporting the automatic control protocol, obtain the device type of the external device from the data stream; in response to the device type being a single-mode device, switch the play mode into a mode supported by the single-mode device; and in response to the device type being a multi-mode device, configure an extension protocol and switch the play mode according to the extension protocol; where the extension protocol is configured to transfer the usage scenario information of the external device.

In some embodiments, the at least one processor is further configured to execute the instructions to cause the display apparatus to: in response to the device type being the multi-mode device, periodically obtain protocol frame data; traverse parameter values in a plurality of bits in the protocol frame data; read current usage scenario information according to a combination of the parameter values in the plurality of bits; and set the play mode to a mode which adapts to the current usage scenario information.

In some embodiments, the mode which adapts to the current usage scenario information includes a complete LLM and a non-complete LLM.

In some embodiments, the at least one processor is further configured to execute the instructions to cause the display apparatus to: in response to the mode which adapts to the current usage scenario information being the complete LLM, shut down all image quality processing options for the data stream; and in response to the mode which adapts to the current usage scenario information being the non-complete LLM, shut down all image quality processing options other than a specified image quality processing option for the data stream.

In some embodiments, the at least one processor is further configured to execute the instructions to cause the display apparatus to: in response to the external device not supporting the automatic control protocol, obtain the device type of the external device according to data of a specified bit in the device information frame; in response to the device type being a first type of device, set the play mode being an LLM; and in response to the device type being a second type of device, set the play mode being an HIQM.

In some embodiments, the at least one processor is further configured to execute the instructions to cause the display apparatus to: in response to the external device being connected with the external device interface for a first time, obtain scenario switching information of the external device within a detection period and parameter change information of automatic control protocol marker bits in the data stream; in response to the scenario switching information matching the parameter change information, generate control protocol supporting information for indicating that the external device supports the automatic control protocol; and store the control protocol supporting information.

In a second aspect, the present application provides a processing method in a display apparatus, including: receiving a data stream from an external device in connection with the display apparatus; obtaining a device information frame in the data stream, where the device information frame is a data frame generated by the external device according to a basic transmission protocol between the external device and the display apparatus; traversing marker bits in the device information frame; where a state value of a specified marker bit in the marker bits indicates whether the external device supports an automatic control protocol between the external device and the display apparatus; in response to the external device supporting the automatic control protocol, switching a play mode according to usage scenario information added in the data stream; where the automatic control protocol is configured to transmit a control instruction indicating that the external device actively controls the display apparatus to switch the play mode; in response to the external device not supporting the automatic control protocol, switching a play mode according to a device type of the external device.

DETAILED DESCRIPTION OF THE EMBODIMENTS

Figure 1:
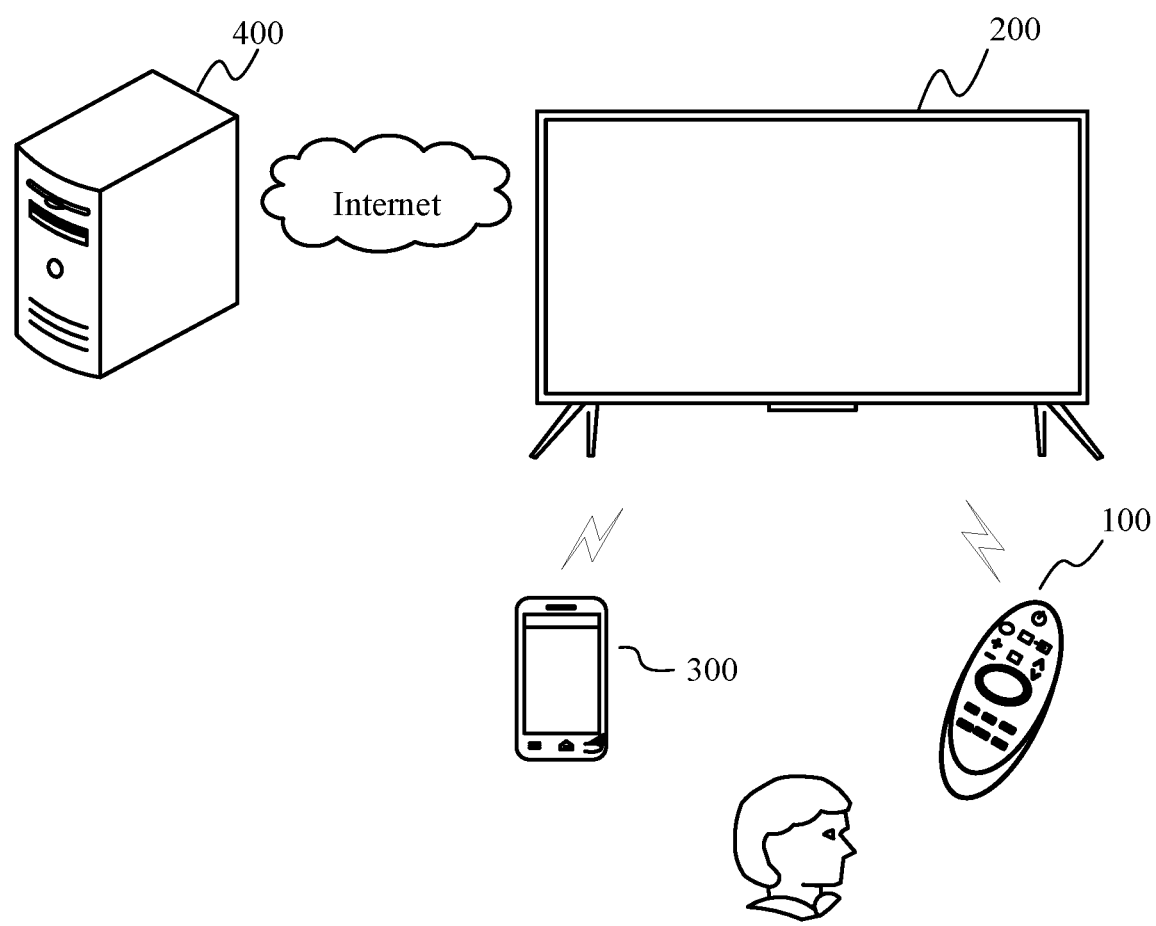
FIG. 1 is a schematic diagram of an operation scenario between a display apparatus and a control device according to one or more embodiments of the present application.

As shown in FIG. 1, a user may operate a display apparatus 200 through a mobile terminal 300 and a control device 100. The control device 100 may be a remote control, communication between the remote control and the display apparatus includes infrared protocol communication and Bluetooth protocol communication, and the display apparatus 200 is controlled in a wireless or other wired modes. The user may control the display apparatus 200 by inputting a user command through keys on the remote control, voice input, control panel input and the like. In some embodiments, the display apparatus 200 may also be controlled by using a mobile terminal, a tablet computer, a computer, a notebook computer and other intelligent devices.

In some embodiments, software applications may be installed on both the mobile terminal 300 and the display apparatus 200 to realize connection and communication through a network communication protocol, and further achieve the purposes of one-to-one control operations and data communication. Audio and video contents displayed on the mobile terminal 300 may also be transmitted to the display apparatus 200 to realize a synchronous display function, and the display apparatus 200 also communicates with a server 400 through a plurality of communication modes. The display apparatus 200 may perform communication connection through a local area network (LAN), a wireless local area network (WLAN) or the other networks. The server 400 may provide various contents and interactions to the display apparatus 200. The display apparatus 200 may be a liquid crystal display, an organic light-emitting diode (OLED) display and a projection display apparatus. In addition to providing broadcast receiving function, the display apparatus 200 may further additionally provide a smart network television function.

Figure 2:
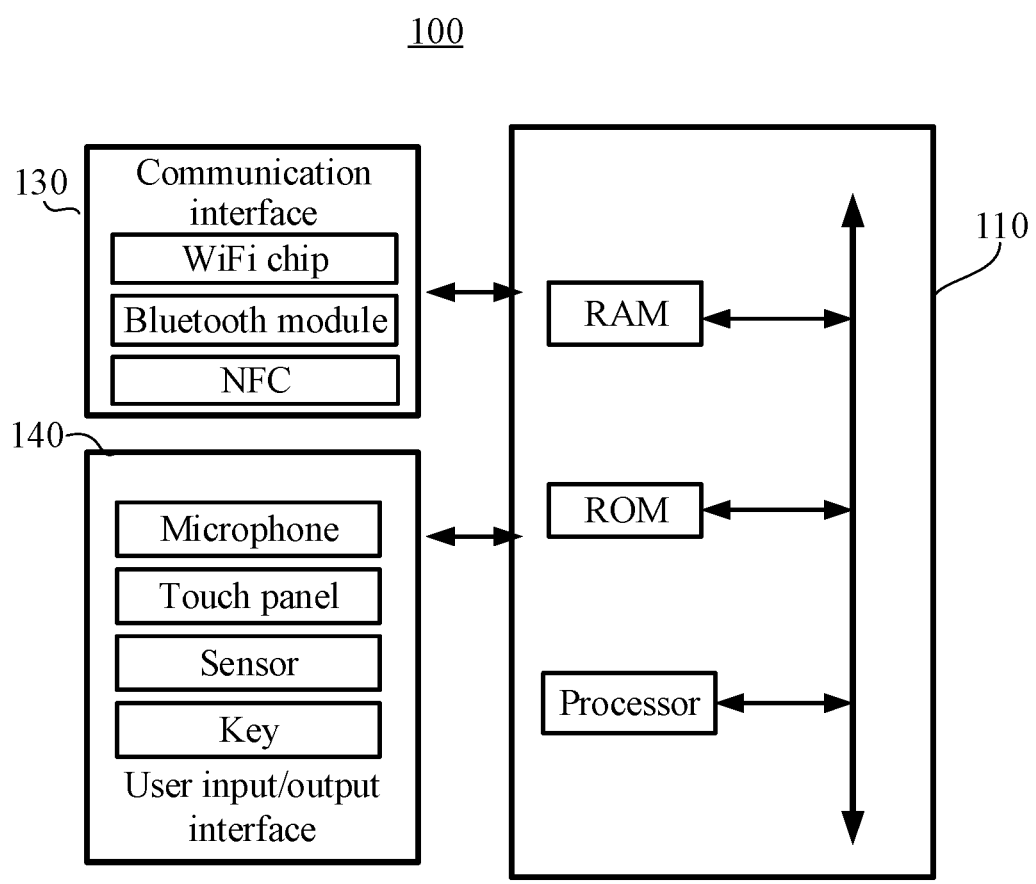
FIG. 2 is a block diagram of a hardware configuration of a display apparatus 200 according to one or more embodiments of the present application.

As shown in FIG. 2, the control device 100 includes at least one processor 110, a communication interface 130, a user input/output interface 140, a memory and a power supply. The control device 100 may receive an operation command input from a user and convert the operation command into an instruction which can be recognized and responded by the display apparatus 200, and plays an intermediary role in the interaction between the user and the display apparatus 200. The communication interface 130 is configured for communication with outside, and includes at least one of a WIFI chip, a Bluetooth module, a near field communication (NFC) or an alternative module. The user input/output interface 140 includes at least one of a microphone, a touch panel, a sensor, a key or an alternative module.

Figure 3:
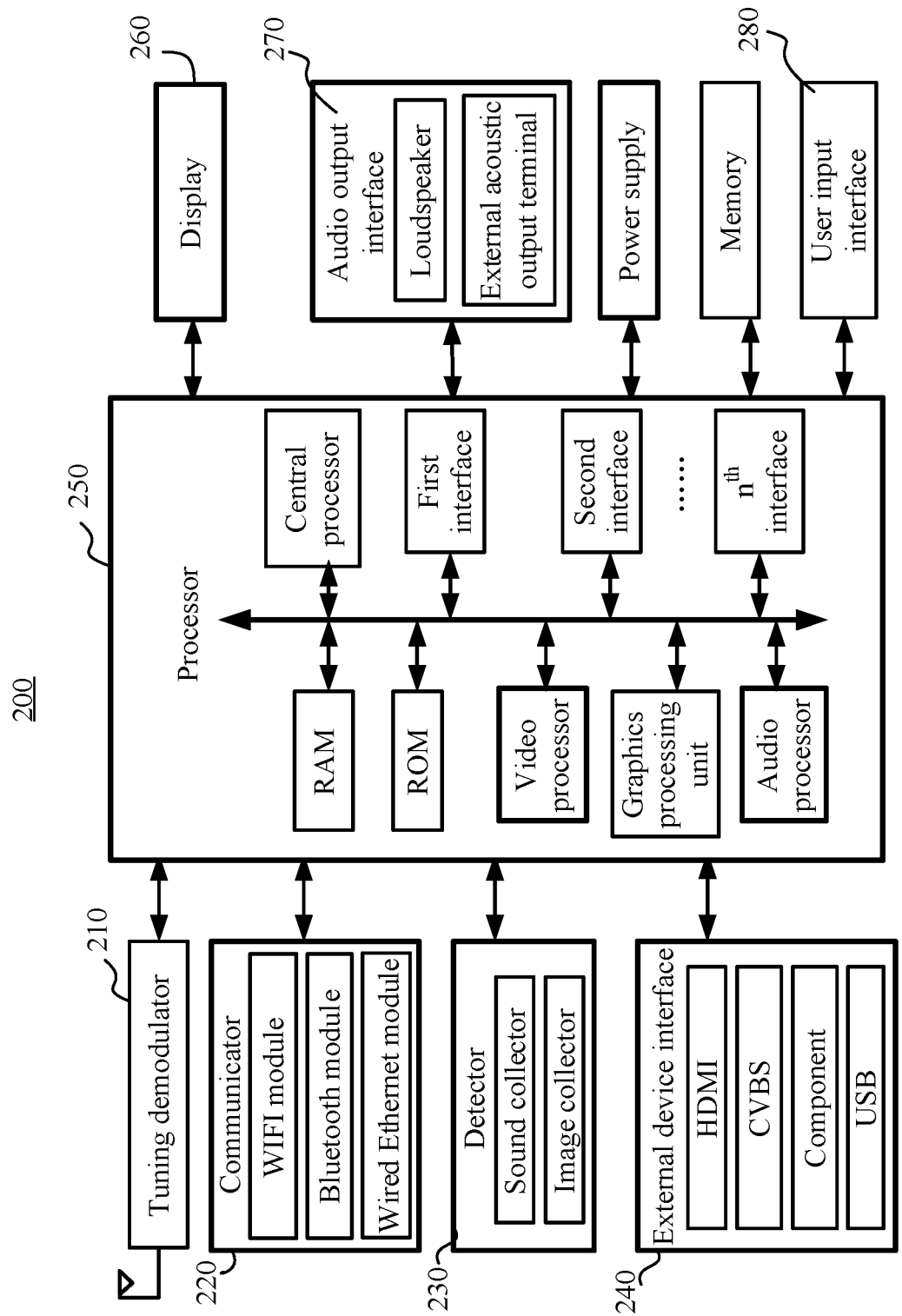
FIG. 3 is a block diagram of a hardware configuration of a control device 100 according to one or more embodiments of the present application.

The display apparatus 200 as shown in FIG. 3 includes at least one of a tuning demodulator 210, a communicator 220, a detector 230, an external device interface 240, at least one processor 250, a display 260, an audio output interface 270, a memory, a power supply, or a user input interface 280. The at least one processor includes a central processor, a video processor, an audio processor, a graphics processing unit, a random access memory (RAM), a read-only memory (ROM), and a first interface to an $n^{th}$ interface configured for input/output. The display 260 may be at least one of a liquid crystal display, an OLED display, a touch display or a projection display, and may also be a projection apparatus and a projection screen. The tuning demodulator 210 receives a radio and television signal in a wired or wireless receiving mode, and demodulates audio and video signals, such as an electronic program guide (EPG) data signal, from a plurality of wireless or wired radio and television signals. The detector 230 is configured to collect signals from an external environment or signals for interacting with outside. The at least one processor 250 and the tuning demodulator 210 may be located in different split devices, that is, the tuning demodulator 210 may also be located in an external device of a host device where the at least one processor 250 is located, such as an external set top box.

In some embodiments, the at least one processor 250 controls the display apparatus to work and respond to users' operations through various software programs stored on the memory. The at least one processor 250 controls an overall operation of the display apparatus 200. A user may input a user command on a graphics user interface (GUI) displayed on the display 260, and the user input interface receives the user input command through the GUI. Or, the user may input a user command by inputting specific sound or gestures, and the user input interface recognizes the sound or gestures through a sensor to receive the user input command.

Figure 4:
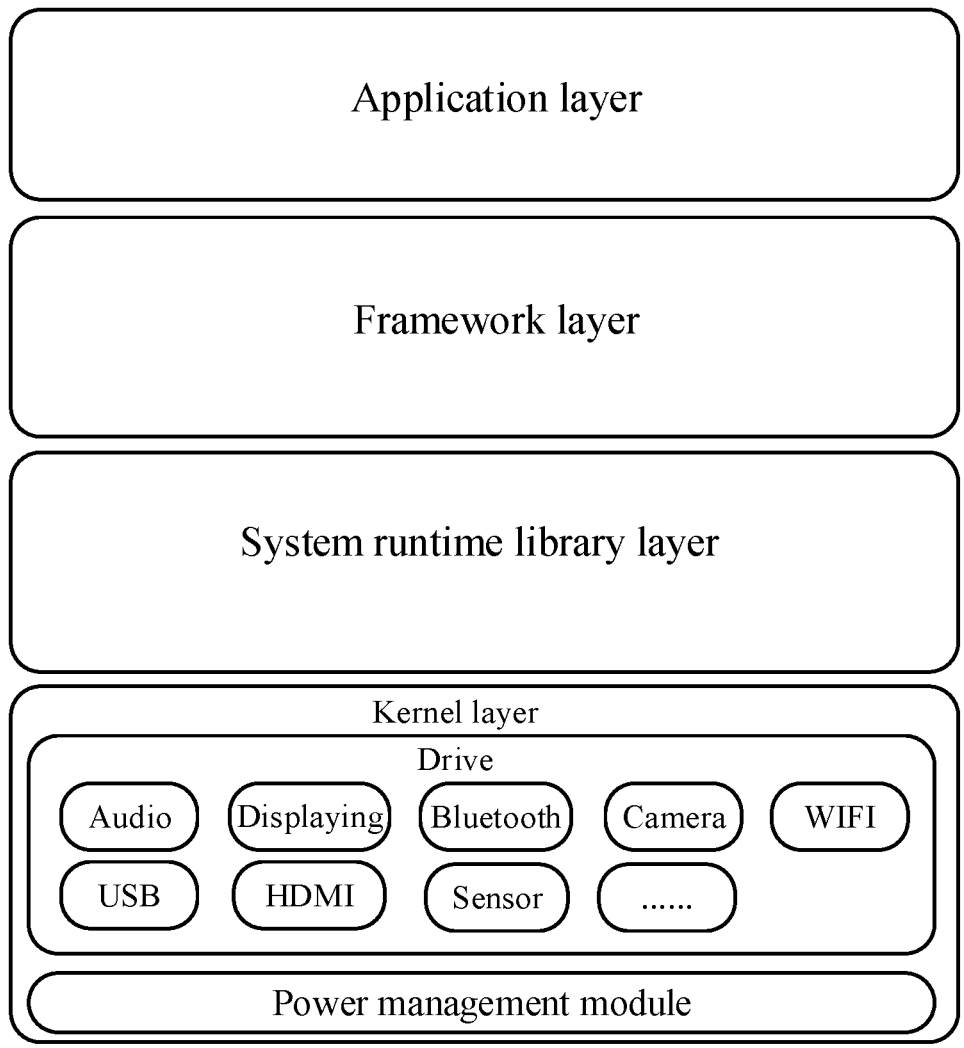
FIG. 4 is a schematic diagram of a software configuration in a display apparatus 200 according to one or more embodiments of the present application.

As shown in FIG. 4, a system is divided into four layers, which are, from top to bottom, an application layer, an application framework layer (for short, "framework layer"), an Android runtime and system library layer (for short, system runtime library layer) and a kernel layer. The kernel layer includes at least one of the following drivers: an audio driver, a display driver, a Bluetooth driver, a camera driver, a WIFI driver, a universal serial bus (USB) driver, a high definition multimedia interface (HDMI) driver, a sensor driver (such as a fingerprint sensor, a temperature sensor, and a pressure sensor) or a power driver.

In the embodiments of the present application, the display apparatus 200 is connected with the external device 500, that is, the display apparatus 200 and the external device 500 establish communication connection, and the display apparatus 200 and the external device 500 serve as a receiving end (a Sink end) and a sending end (a source end) respectively. For example, the external device 500 may be a gaming device, and in the use process of the gaming device, video data and audio data can be output in real time in the gaming process and are sent to the display apparatus 200 so as to be output as a video picture and sound through the display apparatus 200. In this case, the gaming device functions as the source end, while the display apparatus 200 functions as the Sink end.

Figure 5:
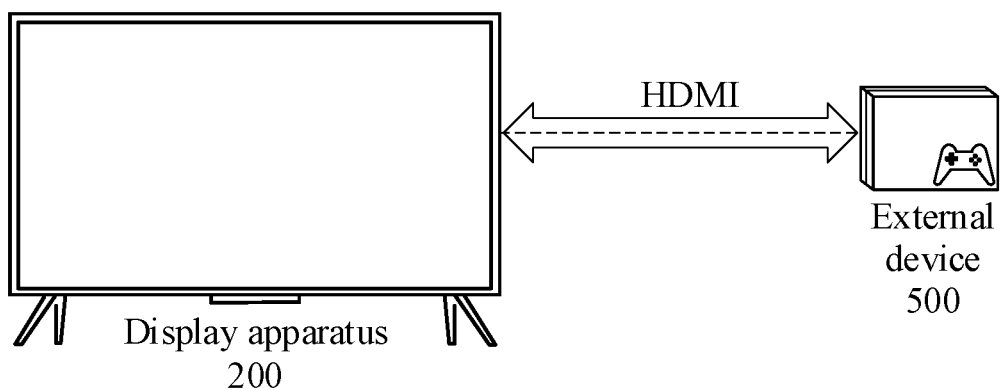
FIG. 5 is a schematic diagram of a connection state of a display apparatus with an external device according to one or more embodiments of the present application.

The source end and the Sink end may achieve communication connection via a particular interface to transmit data. To this end, data interfaces according to the same interface specification and function shall be provided at both the source end and the Sink end. For example, as shown in FIG. 5, HDMI is provided on both the display apparatus 200 and the external device 500. In the use process, a user may plug the two ends of an HDMI data line in the display apparatus 200 and the external device 500 respectively, and after the external device 500 and the display apparatus 200 are started, HDMI signal source is set as the signal source of the display apparatus 200, to achieve data transmission between the display apparatus 200 and the external device 500.

It should be noted that, in order to achieve the communication connection between the display apparatus 200 and the external device 500, other connection modes may be further adopted between the display apparatus 200 and the external device 500. A specific connection mode may be a wired connection mode, such as a digital visual interface (DVI), a video graphics array (VGA) and a USB; and may also be a wireless connection mode, such as a wireless local area network, Bluetooth connection and infrared connection. The different communication connection modes may adopt different information transmission protocols, for example, when the connection is realized by a HDMI port, data transmission may be performed according to a HDMI protocol.

In the running process, the external device 500 may output video data and/or audio data in real time according to usage conditions. Under different usage scenarios, a video signal and an audio signal output from the external device 500 need to adapt to corresponding scenarios, thereby obtaining the better image quality effect and sound quality effect. Therefore, a plurality of play modes may be built in the display apparatus 200, and in different play modes, different image quality and sound quality effects may be obtained.

For example, play modes which can be switched by the display apparatus 200 may include a low-latency mode (LLM) and a high image quality mode (HIQM). For the external device 500 such as a game machine, since a game picture needs to keep good smoothness and response speed, the display apparatus 200 may be controlled to switch to the LLM when a game picture is output via the display apparatus 200. In the LLM, the display apparatus 200 may shut down some image quality processing programs, such as a frame interpolation algorithm, noise reduction processing and a super-resolution algorithm, so that picture processing time is shortened, and picture display latency is lowered. For the external device 500 such as a set top box, since a screen picture focuses more on the picture quality compared with a game picture and does not need a too high display response speed, when the display apparatus 200 is used to play a screen picture transmitted from the set top box, the display apparatus 200 may be controlled to switch to the HIQM to start all image quality processing programs such as the frame interpolation algorithm, noise reduction processing and the super-resolution algorithm, to obtain a better picture effect.

However, since there is no dependence between the external device 500 and the display apparatus 200, the external device 500 usually cannot directly control the display apparatus 200, so that in practical applications, a user needs to manually switch the play modes of the display apparatus 200. In the manual switching process, the user needs to perform an interaction operation, and some users are not aware of a play mode suitable for the external device 500, resulting in wrong switching of the play modes. Some external devices 500 may be in multiple different usage scenarios, such as game scenario, a movie scenario, an instant communication scenario and the like, according to different usage requirements. These scenarios may exhibit better effects in particular play modes. However, since the play mode of the display apparatus 200 needs to be switched manually, when the user changes the usage scenario on the external device 500, the user needs to further change the play mode of the display apparatus 200, causing inconvenience to the user.

As the display apparatus 200 and the external device 500 typically belong to different types of devices, the user usually cannot directly control the display apparatus 200 through the external device 500. For example, when the connection between a smart television and a gaming device is established through an HDMI, the gaming device is responsible for running a game application and forming video data and audio data according to a user interaction operation, while the smart television can only obtain the audio data and the video data output by the gaming device passively, and the gaming device cannot directly adjust a play mode of the smart television, resulting in inconsistency of the play mode and a usage scenario, and affecting the video and audio effects.

Auto Low-Latency Mode.

In order to adapt to different usage scenarios, in some embodiments, the external device 500 may support an auto low-latency mode (ALLM). In the ALLM, the source end may automatically enable or disable the LLM at the Sink end according to a preset rule in a case of not requiring manual setting by a user at the Sink end. For example, the user receives a video call when watching a movie, and in this case, the external device 500 as the source end will automatically stop playing the movie and notify the display apparatus 200 at the Sink end to switch to the LLM, to guarantee real-time interaction performance of the video call. After the user finishes answering the video call, the external device 500 at the source end may resume the movie playing process and notify the display apparatus 200 at the Sink end to exit from the LLM state.

However, there are just a few external devices 500 supporting the ALLM protocol on the market, which limits application of a parameter adaptive function relying on the ALLM protocol. For example, Xbox series game machines support the ALLM protocol, while a part of other types of game machines do not support the ALLM protocol, which makes it difficult to automatically send a control instruction for switching a play mode to the display apparatus 200 when the game machines enter game running state.

Figure 6:
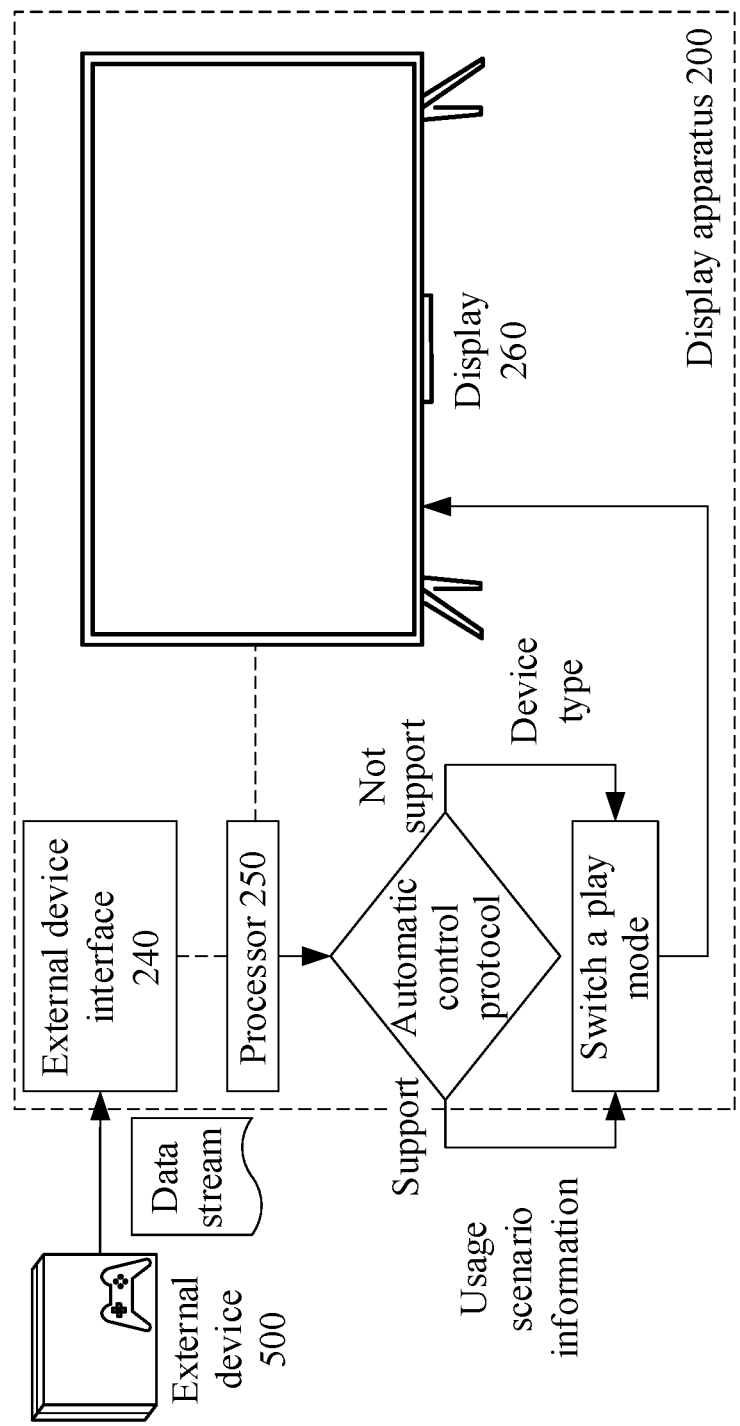
FIG. 6 is a schematic flow diagram of adjusting a play mode of a display apparatus according to one or more embodiments of the present application.

Based on this, in some embodiments of the present application, as shown in FIG. 6, the display apparatus 200 may detect whether the external device 500 supports automatic control protocol such as the ALLM protocol by detecting a data stream from the external device 500, and switch the play mode for a control protocol supported by the external device 500. In order to automatically switch the play mode, the display apparatus 200 may include the display 260, the external device interface 240, a memory and at least one processor 250; and the external device 500 may include a data interface and at least one processor. The external device 500 is connected with the display apparatus 200 by connecting the external device interface 240 with the data interface through HDMI cable. After connecting with the display apparatus 200, the external device 500 may send the data stream to the display apparatus 200. The data stream includes video data and audio data for play.

For ease of description, in the embodiments of the present application, after establishing connection between the source end and the Sink end, the transmitted video data and audio data are collectively referred to as media resource data. Apparently, for different external devices 500, the media resource data may be the video data or the audio data, or a combination of the video data and the audio data. After the media resource data form a data stream, in addition to the video data and the audio data, the data stream formed may further include auxiliary information such as a control instruction and device information for implementing linked control between the display apparatus 200 and the external device 500.

In order to send the auxiliary information to the display apparatus 200, the external device 500 may package the auxiliary information to auxiliary information frames according to an interface protocol supported by the interface, and the auxiliary information frames are sent to the display apparatus 200 together with the data stream. The auxiliary information frames may be presented in different forms according to different protocols supported by the external device 500. For the external device 500 supporting the automatic control protocol (such as the ALLM protocol), the auxiliary information such as the control instruction may be packaged into protocol frames; and for the external device 500 not supporting the automatic control protocol, the auxiliary information such as the device information may be packaged into device information frames (source product description, SPD) according to a basic transmission protocol (such as HDMI protocol). The automatic control protocol is configured to transmit the control instruction for indicating that the external device 500 actively controls the display apparatus 200 to switch the play mode.

For example, when the external device 500 in connection with the external device interface 240 of the display apparatus 200 is an Xbox series game machine, and the Xbox series game machine is an external device 500 supporting the automatic control protocol such as the ALLM protocol, the external device 500 may directly control the display apparatus 200 to switch the play mode according to the automatic control protocol, that is, the display apparatus 200 may extract usage scenario information from the data stream and switch the play mode according to the usage scenario information. In the use process, the game machine may add the usage scenario information into the data stream, that is, the usage scenario information is added into the data stream as a game scenario when a game program is running, and the usage scenario information is added into the data stream as a non-game scenario when the game program exits. The display apparatus 200 may be switched to LLM when it is detected that the usage scenario information is the game scenario, and switched to the HIQM when it is detected that the usage scenario information is the non-game scenario.

Figure 7:
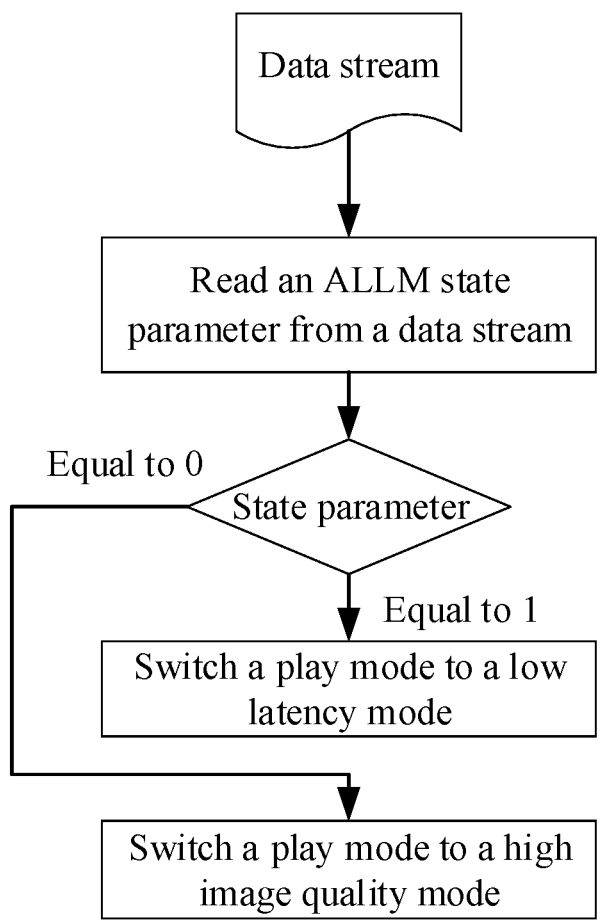
FIG. 7 is a schematic diagram of switching a play mode according to ALLM state parameters according to one or more embodiments of the present application.

The external device 500 supporting the automatic control protocol may send device parameter frame data (or protocol frame data) to the display apparatus 200 according to a control strategy in applications. The display apparatus 200 may read state parameters at a particular position in the protocol frame data, to determine a control mode according to the state parameters. For example, as shown in FIG. 7, after the external device 500 is connected with the display apparatus 200, ALLM protocol frames may be extracted from the data stream. In the ALLM protocol frames, the auxiliary information such as the control instruction may be denoted through a plurality of bits at particular positions in the data frames. The protocol frames are formulated and generated according to an agreed ALLM control protocol, and may be used for describing device information of the external device 500 and other information related to a data transmission process. The display apparatus 200 may read an ALLM state value. If the ALLM state value is 1, it represents that the current external device 500 is in the game scenario, and thus the display apparatus 200 may be controlled to switch the play mode to the LLM. If the ALLM state value is 0, it represents that the current external device 500 is in the non-game scenario, and thus the display apparatus 200 may be controlled to switch the play mode to the HIQM.

Extension Protocol.

In addition to basic information, in the protocol frames, some bits may be further reserved, and these bits may be given particular values, namely state values, by a source end device. Therefore, in the embodiments, a particular state value may be configured in each bit to transmit the usage scenario information to the display apparatus 200. For example, for a computer device, two bits reserved in the HDMI specification may be utilized to denote a usage scenario, that is: Rsvd1=0 and Rsvd0=0 indicate a game scenario; Rsvd1=0 and Rsvd0=1 indicate an instant communication scenario; Rsvd1=1 and Rsvd0=0 indicate an office scenario; and Rsvd1=1 and Rsvd0=1 indicate a sports scenario.

Figure 8:
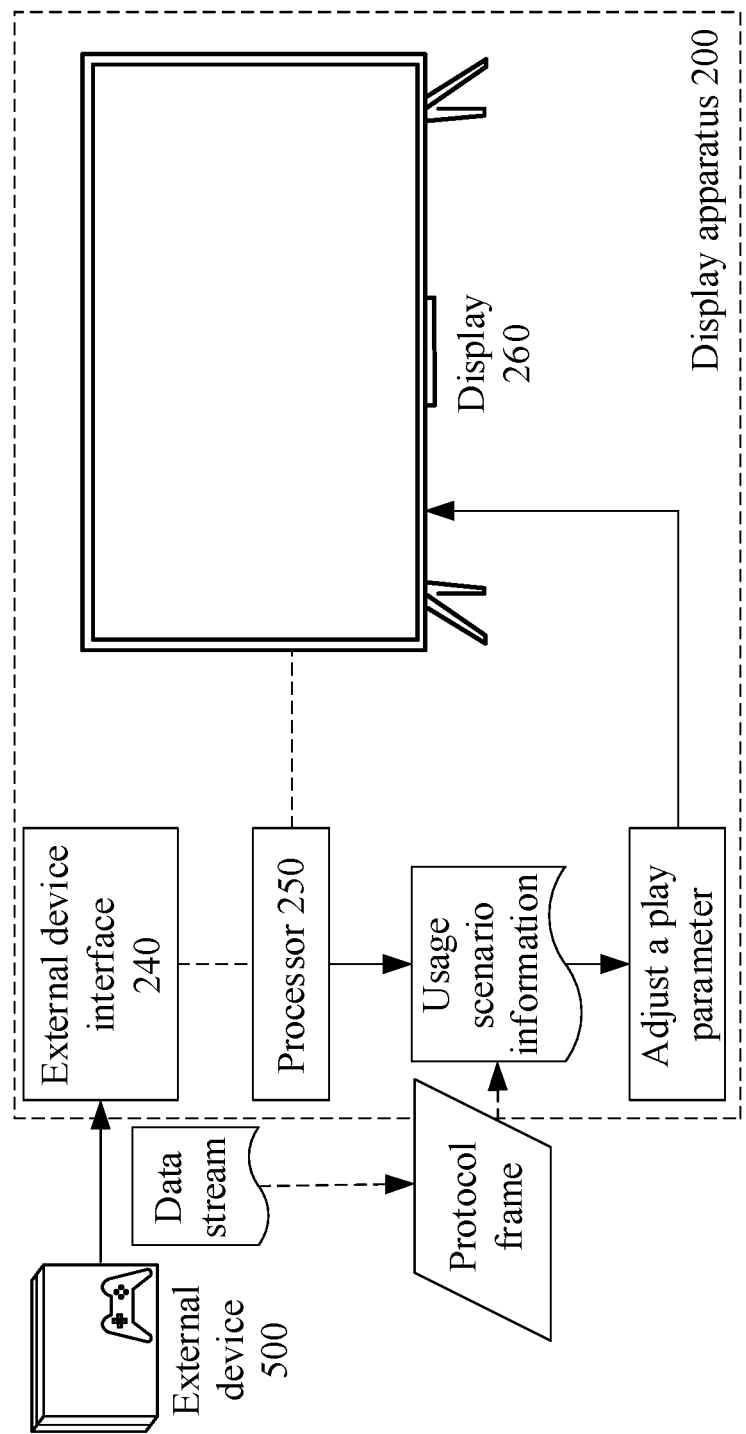
FIG. 8 and FIG. 9 are schematic diagrams of switching a play mode according to usage scenario information according to one or more embodiments of the present application.

In some embodiments, referring to FIG. 8, the protocol frames may be further added into the data stream while the external device 500 sends the media resource data to the display apparatus 200, the display apparatus 200 may determine the usage scenario information of the external device 500 by extracting the protocol frames and traversing combinations of the state values in a plurality of bits, and finally the display apparatus 200 may adjust play parameters according to a predetermined play parameter adjusting mode according to the usage scenario information. For example, when Rsvd1=0 and Rsvd0=0 are read, it is determined that the current external device 500 is in the game scenario, the game scenario needs to keep good synchronization and picture response speed, and thus the display apparatus 200 may shut down unnecessary and time-consuming image quality processing programs to lower display latency in the game scenario when the display apparatus 200 obtains that the external device 500 is in the game scenario. In the use process, the display apparatus 200 may switch the play mode in real time according to the usage scenario of the external device 500 by continuously monitoring the protocol frames in the data stream. For example, the display apparatus 200 at the Sink end may periodically detect the data stream and parse ALLM marker bits in the protocol frames in real time to determine whether it is required to switch to the LLM now through the ALLM marker bits. After the external device 500 triggers the display apparatus 200 at the Sink end to enter the LLM through the ALLM, the display apparatus 200 needs to maintain this mode until the external device 500 at the source end notifies the display apparatus 200 at the Sink end to exit from the LLM. After the source end notifies the display apparatus 200 at the Sink end to exit from the LLM, the display apparatus 200 at the Sink end needs to resume an image mode before the LLM.

It should be noted that, when the external device 500 causes LLM switching through the ALLM, the display apparatus 200 at the Sink end needs to temporarily limit a video signal and audio signal and does not directly play a signal from the external device 500 at the source end, so that the at least one processor 250 can determine whether switching needs to be executed within this period. In order to achieve non-perceptive interactions to obtain the better user experience, during switching, the display apparatus 200 at the Sink end may display a blocking picture, such as a black screen, a blurred screen or on-screen display (OSD) blocking, but on the premise of meeting switching running time, the display time should be as short as possible, for example, the display time does not exceed 1 s. Meanwhile, irrelevant prompt sound cannot appear, including knocking sound, clicking sound or system prompt sound.

For the external device 500 supporting the automatic control protocol, different external devices 500 correspond to different usage scenarios. Some external devices 500 may support a plurality of usage scenarios, for example, a computer device, a smart terminal and the like may be used in the game scenario, the instant communication scenario and the like; and these external devices 500 may be used in different usage scenarios and thus are called multi-mode devices. Some external devices 500 only support a single usage scenario, such as a game machine, a set top box and a multimedia player; and these external devices 500 generally do not switch or barely switch the usage scenarios in use, and thus are called single-mode devices.

Therefore, in some embodiments, after it is detected that the external device 500 is connected with the display apparatus 200, the display apparatus 200 may extract a device type of the external device 500 from the data stream. A device type may be detected and obtained by reading contents in the device information frames carried in the data stream, for example, the device type of the external device 500 may be determined by reading data such as a device name, a device mac address and device interface information.

If the device type is the single-mode device, the play mode is switched to a mode supported by the single-mode device. For example, when it is detected that the external device 500 is a multimedia player, namely the single-mode device, the play mode may be controlled to be switched to the HIQM required for the multimedia player.

As the external device 500 supporting the multi-mode may be switched to different usage scenarios via users' operations, if the device type is a multi-mode device, an extension protocol may be configured, to enable the external device 500 in connection with the display apparatus 200 to send the usage scenario information in the protocol frame data, and thus the current usage scenario information is sent to the display apparatus 200, and the display apparatus 200 switches the play mode according to an extension protocol. The extension protocol is used for transferring the usage scenario information of the external device 500. For example, when it is detected that the external device 500 is a computer device, namely the multi-mode device, the extension protocol may be configured to enable the computer device to carry the usage scenario information in the data stream.

The extension protocol may additionally define some data fields according to the data transmission characteristics of the automatic control protocol. For example, a plurality of bits reserved in the HDMI specification may be utilized to indicate the usage scenario information of the external device 500. For the computer device, two bits reserved in the HDMI specification may be utilized to indicate a usage scenario, that is: Rsvd1=0 and Rsvd0=0 indicate game scenario; Rsvd1=0 and Rsvd0=1 indicate instant communication scenario; Rsvd1=1 and Rsvd0=0 indicate office scenario; and Rsvd1=1 and Rsvd0=1 indicate sports scenario.

Figure 9:
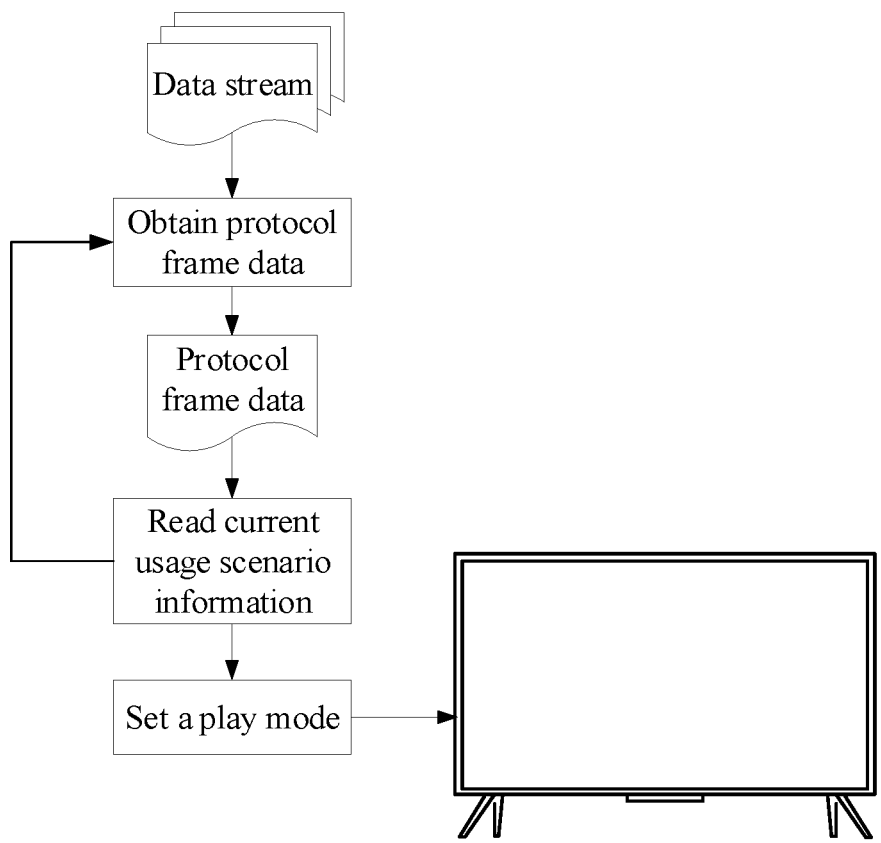

Correspondingly, as shown in FIG. 9, by periodically obtaining the protocol frame data and traversing parameter values in a plurality of bits in the protocol frame data, the display apparatus 200 may read the current usage scenario information according to combinations of the parameter values in the plurality of bits, and finally set the play mode to a mode which adapts to the current usage scenario information.

For example, the display apparatus 200 may extract the protocol frame data from the data stream at an interval of 1 s and read parameter values on two bits specified by the extension protocol. When Rsvd1=0 and Rsvd0=0 are read, it is determined that the current computer device is in the game scenario, and the play mode adaptive to the game scenario is the LLM, so that the play mode of the display apparatus 200 may be switched to the LLM. When Rsvd1=1 and Rsvd0=1 are read, it is determined that the current computer device is in the sports scenario such as watching a ball game, and the play mode adaptive to the sports scenario is a motion estimation and motion compensation (MEMC) mode, so that the play mode of the display apparatus 200 may be switched to the MEMC mode, that is, an MEMC function is started to perform image quality processing on transmitted media resource pictures.

Apparently, various usage scenarios may also be indicated through reserved marker bits of the protocol frames. For example, the running games can be differentiated by using state value combinations of the marker bits Rsvd1 and Rsvd0, to facilitate control and modification of the play parameters. It should be noted that in the above embodiments, the four usage scenarios are described with the state value combinations on the two bits, but for the external device 500 supporting more usage scenarios, the number of the reserved marker bits may be further increased, for example, a racing game scenario is indicated through Rsvd0=0, Rsvd1=0 and Rsvd2=0, a shooting game scenario is indicated through Rsvd0=0, Rsvd1=0 and Rsvd2=1, and so on. The skilled in the art may obtain other indication manners, such as increasing or decreasing the number of the marker bits and providing more state value forms, based on the above principles.

Figure 10:
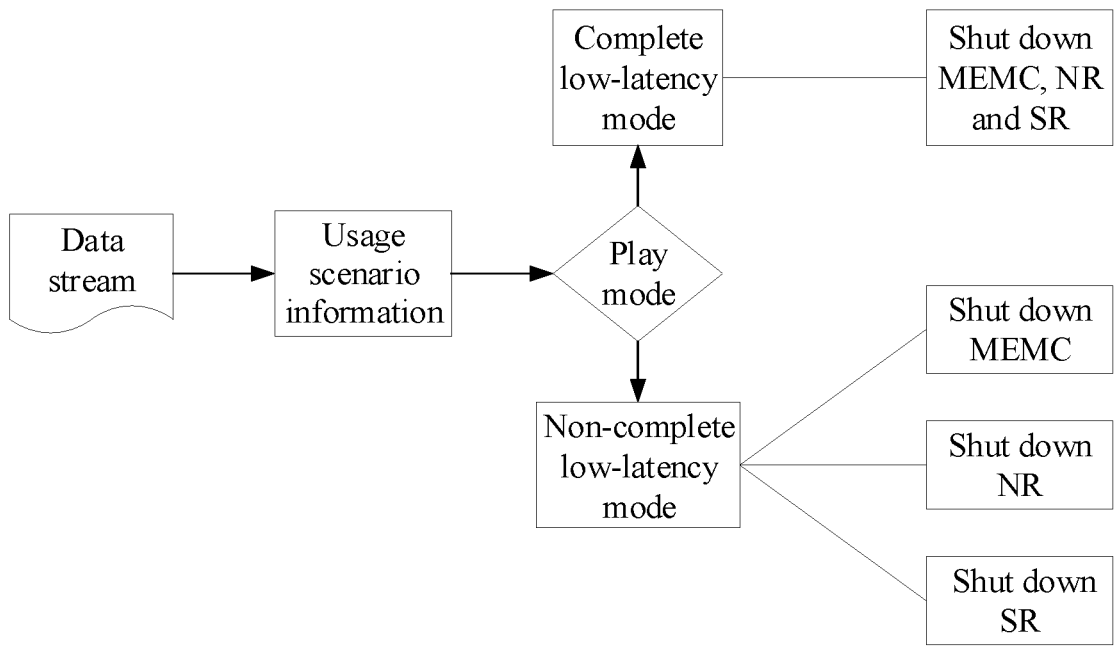
FIG. 10 is a schematic diagram of image quality processing in adjustment of a play mode according to one or more embodiments of the present application.

As shown in FIG. 10, in some embodiments, the modes adaptive to the current usage scenario information include a complete LLM and a non-complete LLM, and if the mode adaptive to the current usage scenario information is the complete LLM, all image quality processing options, the super-resolution algorithm, a noise reduction algorithm and the like for the data stream are shut down. The LLM where only some image quality processing is shut down means that one or more of the above image quality processing algorithms are shut down, and remaining one or more image quality processing algorithms are reserved to adapt to different usage scenarios; and if the mode adaptive to the current usage scenario information is the non-complete LLM, all image quality processing options other than a specified image quality processing option for the data stream are shut down.

For example, after a computer device is in connection with a smart television through an HDMI, the computer device end may have a plurality of usage scenarios, including watching a movie, playing a game, watching a ball game, video calls, office work, etc. The scenario of watching a movie corresponds to a complete HIQM, while the scenario of playing a game corresponds to the complete LLM. However, when watching a ball game, a user may also care about the picture smoothness while pursuing a low latency effect, and in this case, it may not lower latency by shutting down the MEMC function which improves the image quality smoothness. For another example, during video calls, since the picture resolution is low during the video calls and the resolution needs to be improved through the super-resolution algorithm (SR) and the noise reduction algorithm (NR), latency needs to be lowered for the video call scenario, but the super-resolution algorithm and the noise reduction algorithm cannot be shut down.

It can be seen that in the embodiments, different play methods of data stream may be adopted according to different modes; by utilizing the reserved marker bits of the ALLM protocol frames, the external device 500 at the source end may provide more detailed image quality processing manners while requiring a low latency scenario; and after corresponding usage scenario information is sent to the display apparatus 200 at the Sink end, the display apparatus 200 at the Sink end may adjust its own working parameters in a finer mode according to the information, so as to adapt to the low latency requirement under the different scenarios. Determination of the Device Type Through SPD Data Frames.

Figure 11:
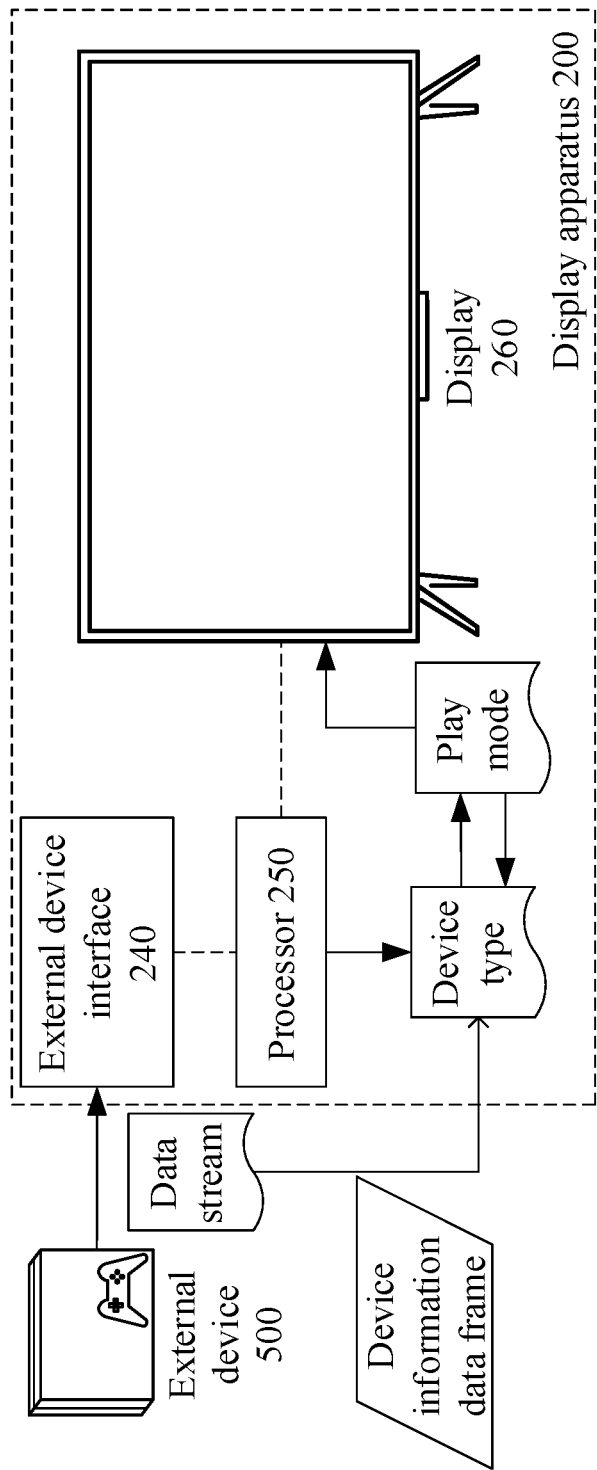
FIG. 11 is a schematic diagram of switching a play mode according to a device type according to one or more embodiments of the present application.

For the external device 500 which does not support the automatic control protocol, since such external device 500 cannot transmit a control instruction through the automatic control protocol such as the ALLM, in order to adapt to different usage scenarios, as shown in FIG. 11, the device type may be extracted from the data stream, and the play mode is switched according to the device type. For example, SPD data frames describing information of a device itself are specified in the HDMI protocol; and different from the ALLM protocol frames, the SPD data frames are generated based on the basic HDMI protocol, and the auxiliary information for describing the device information may be sent to the display apparatus 200 in a case of not performing additional configuration on the external device 500. The external device 500 may send the SPD data frames according to a preset time interval while transmitting media resource information data. After receiving the SPD data frames, the display apparatus 200 reads device classifications on particular byte positions from the SPD data frames, and if a device classification is determined as a game machine through reading device information, the display apparatus 200 is controlled to switch to the LLM.

In order to recognize the device type, in some embodiments, the display apparatus 200 may extract device information frames from the data stream, and obtain a type of the external device according to data of specified bits in the device information frames. For example, products supporting an SPD (data frame) protocol are popular, and mainstream external devices 500 can all send SPD protocol frame data, so that when the external device 500 does not support an ALLM function, type information of the external device 500 may be obtained through the SPD protocol frames. For more precise determination, other auxiliary information, such as manufacturer information and type information, may also be extracted from the SPD data frames to be used for determining the device type. According to usage habits of users, a main usage scenario of a gaming type device is the game scenario, a main usage scenario of a smart terminal device is picture cast, and both scenarios above require the effect of the lower picture transmission latency, namely requiring the LLM; while other types of devices, such as a set top box and a digital video disc (DVD) are mainly used for a movie watching scenario, which requires the HIQM in this case.

It should be noted that, in the embodiments, for ease of description, a device requiring the lower picture transmission latency in usage habit is called a first type of device, and a device requiring the higher picture quality is called a second type of device. Therefore, after the device type of the external device 500 is obtained, the device type may be determined, if the device type is the first type of device, the play mode is set to be the LLM, and if the device type is the second type of device, the play mode is set to be the HIQM.

Similarly, for other types of external devices 500, play modes under different device types may be set according to the usage habits or a customized strategy. For example, a web camera device is usually used for performing network communication according to users' usage habits, so when it is detected that the device type of the external device 500 is a web camera, the play mode of the display apparatus 200 may be switched to a mode with low latency and without shutting down the super-resolution algorithm and the noise reduction algorithm. Through finer classification and more customized play modes, automatic adjustment to an adaptive play scenario may also be achieved when the external device 500 does not support the automatic control protocol.

Figure 12:
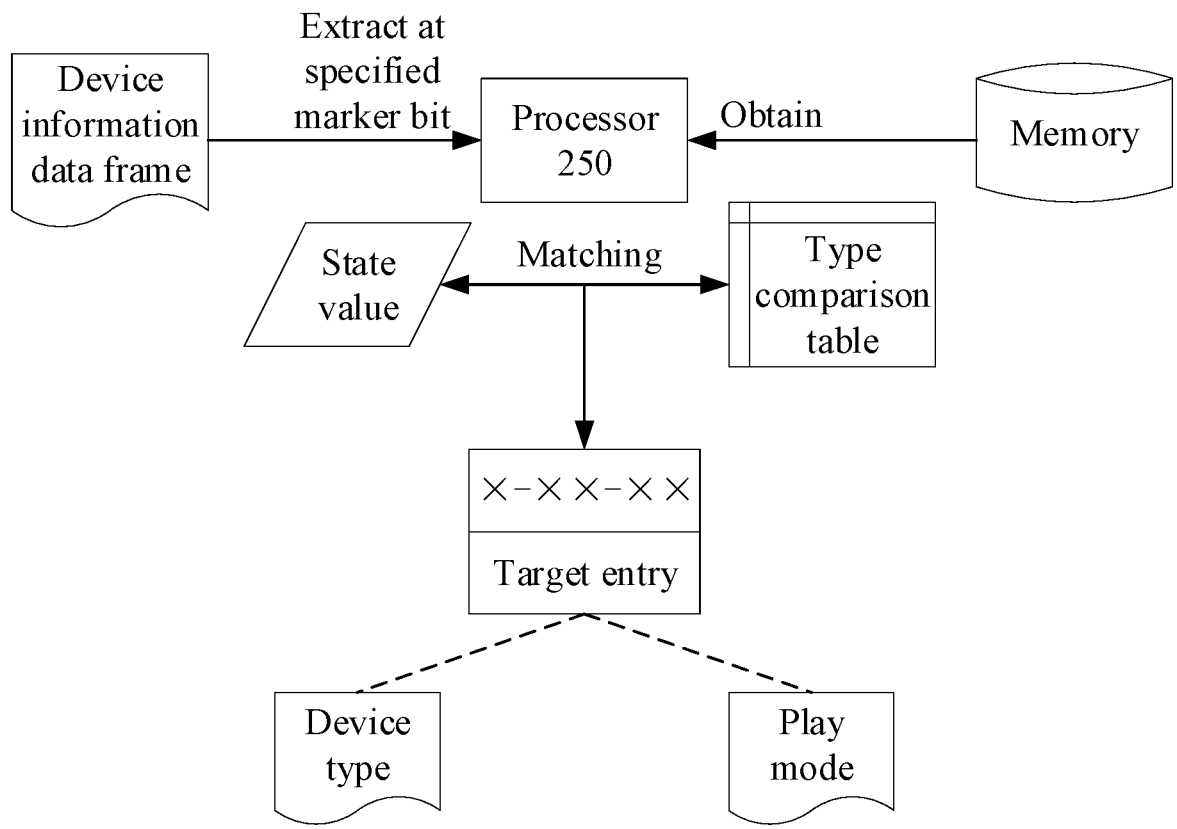
FIG. 12 is a schematic diagram of obtaining a device type according to a type comparison table according to one or more embodiments of the present application.

As shown in FIG. 12, in some embodiments, in order to determine the device type of the external device 500, a type comparison table may also be stored in the display apparatus 200 in advance. The corresponding relationship between state values on specified bits in the device information frames and the device types may be saved in the type comparison table. For example, the 25th byte (data byte 25) in the SPD data frames represents a device classification, its corresponding state value "8" represents a "gaming device", "9" represents a "host device", and "10" represents a "DVD device", and so on.

After obtaining the state values on the specified bits, the type comparison table may be invoked first, and then the state values are used as index values to match target entries in the type comparison table. For example, when a device classification value on a particular bit is read as "8", it is determined through the type comparison table that the external device 500 in connection with the display apparatus 200 is a game machine, and the game machine is usually used for games, so that the play mode may be switched to the LLM.

To facilitate switching of the play mode, in some embodiments, play modes adaptive to the device types may be further recorded in the type comparison table, that is, the type comparison table includes an entry of "state value-device type-adaptive mode", such as "8-game machine-LLM". Therefore, after the target entry corresponding to the state value is matched, image quality parameters and/or sound quality parameters corresponding to the play mode in the target entry may be parsed. The image quality parameters are used for image quality processing, and may include parameters for performing image quality processing manner and reference parameters for specifically performing image quality processing, for example, whether the super-resolution algorithm is performed and a target resolution of the super-resolution algorithm. Similarly, the sound quality parameters are used for performing sound quality processing.

After the image quality parameters and/or the sound quality parameters are obtained by parsing, the display apparatus 200 may further perform image quality processing and/or sound quality processing on the data stream according to the image quality parameters and/or the sound quality parameters, to output the data stream as a video signal and/or an audio signal. For example, a device type is matched with a DVD device through the state value 10, and a corresponding play mode is the HIQM. Therefore, corresponding image quality parameters in the HIQM may be parsed, such as the super-resolution algorithm is performed to increase the picture resolution to 4096×2160, so as to obtain ultra-high-definition picture quality.

In the above embodiments, as the device information frames can only transfer the device type of the external device 500, but the external device 500 is not limited to one usage scenario in the using process, an adaptive play mode is different from what is recorded in the type comparison table when the external device 500 is not in the main usage scenario, resulting in poor data stream output effect. For example, when the external device 500 in connection with the display apparatus 200 is a host device (computer host), the host device may be in a plurality of scenarios such as a game scenario and a movie scenario. When the host device runs a game, but the play mode recorded in the type comparison table is the HIQM used when the main usage scenario of the host device is the movie scenario, the switched play mode does not match the game scenario, which may have negative effect on the output effect.

Figure 13:
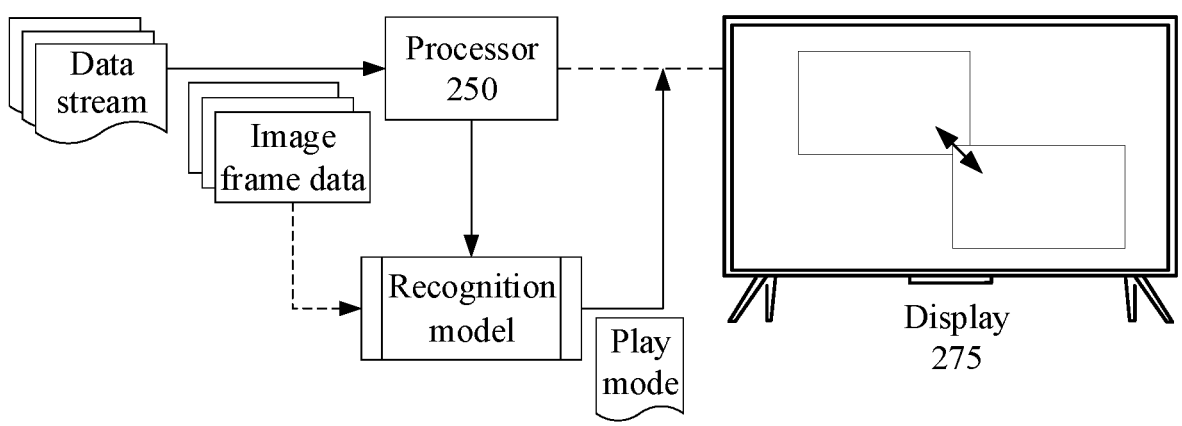
FIG. 13 is a schematic diagram of detecting a usage scenario according to a recognition model according to one or more embodiments of the present application.

For this, as shown in FIG. 13, in some embodiments, the display apparatus 200 may further determine the usage scenario of the current external device 500 through image recognition, thereby dynamically adjusting the play mode according to the change of the usage scenario. In other words, the display apparatus 200 may periodically extract image frame data from the data stream from the external device 500. For example, the image frame data are extracted from the data stream at an interval of 30 s, so that a current to-be-displayed picture is obtained.

The extracted image frame data is input to a recognition model, and is classified through the recognition model. The recognition model may be obtained via sample training through an artificial intelligence machine learning algorithm. In other words, in practical applications, images with classification labels may be input to an initial model, and back propagation is performed according to a classification result output from the model and the classification labels, to adjust model parameters. As such, through massive sample images, the recognition model suitable for the usage scenario of the display apparatus 200 and having high classification accuracy may be obtained.

After the image frame data is input to the recognition model, the recognition model may perform classification calculation on the image frame data to output a corresponding classification result, that is, the usage scenario information is obtained. The display apparatus 200 then switches the play mode according to the obtained usage scenario information. For example, through the image frame data is obtained and input to the recognition model, a corresponding picture in the image frame data is recognized to be a game picture, so that the current usage scenario of the host device may be determined to be the game scenario, and the play mode of the display apparatus 200 is switched to the LLM.

It can be seen that in the embodiments, the display apparatus 200 periodically extracts the image frame data to monitor the usage scenario of the external device 500 in real time, and when the usage scenario is changed, it is switched to the corresponding play mode, so that the play mode can be kept adaptive to the usage scenario, and the output quality of the data stream is improved.

As in some cases, the device type of the external device 500 connected with the display apparatus 200 may change, for example, when a plurality of external devices 500 are in connection with the display apparatus 200 at the same time, the different external devices 500 may wake up each other; and after one of the external devices 500 is awakened, the device type of the device connected with the display apparatus 200 may change.

Figure 14:
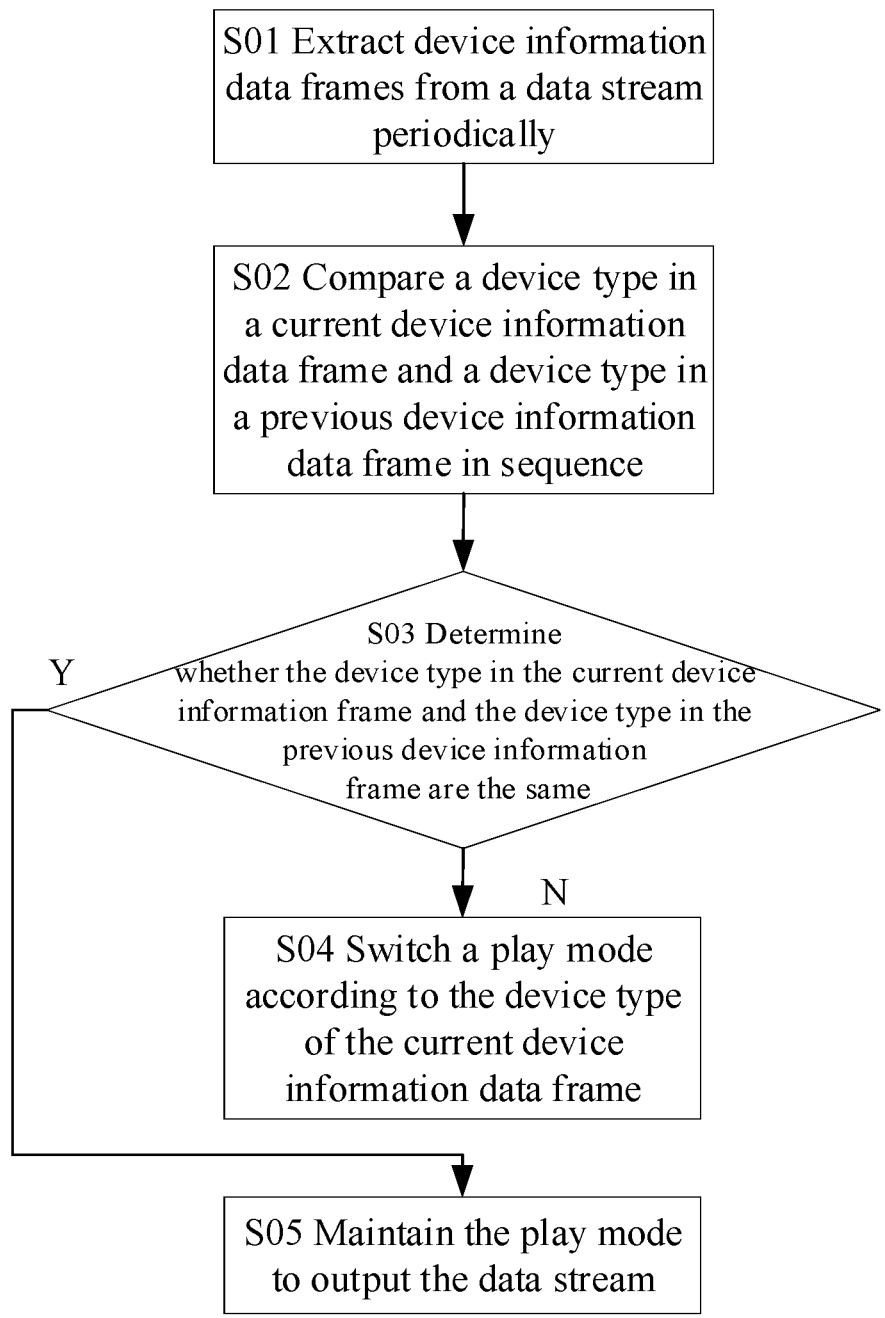
FIG. 14 is a schematic flow diagram of determination of maintaining a play mode according to one or more embodiments of the present application.

Because the different device types correspond to the different play modes, when the device type changes, the play mode needs to be switched, that is, as shown in FIG. 14, the process that the display apparatus 200 determines whether to switch a play mode or maintain a play mode includes: S01, periodically extracting, by the display apparatus 200, the device information frames from the data stream; S02, comparing the device type in a current device information frame with the device type in a previous device information frame in sequence; S03, determining whether the device type in the current device information frame and the device type in the previous device information frame are the same, if not, to perform S04, if yes, to perform S05; S04, switching the play mode according to the device type in the current device information frame.

For example, a computer device and a smart camera device may be in connection with the display apparatus 200 at the same time, and a smart camera may be awakened by a computer as required by a user. As the user uses the display apparatus 200 to display a game picture on the computer, the play mode of the display apparatus 200 is the LLM. After the smart camera device is awakened by the computer device, as the device type is changed to the smart camera device and a play mode suitable for the smart camera is the HIQM, the play mode needs to be switched to the HIQM.

S05, maintaining the play mode to output the data stream, that is, for the device information frames from the same external device 500, the display apparatus 200 directly maintains the stable play mode instead of performing the switching program multiple times.

It should be noted that, since the play modes adaptive to the device types may be stored in the type comparison table, the adaptive play modes may be further compared while the device type in the current device information frame and the device type in the previous device information frame are compared, so that the play mode of the display apparatus 200 is switched to a mode corresponding to the device type in the current device information frame when the adaptive play mode is changed, and the current play mode is maintained when the adaptive play mode is not changed.

For example, when the type of the external device 500 in connection with the display apparatus 200 is switched from the DVD device to the smart terminal device, since both devices are adaptive to the HIQM, the play mode is still not switched even if the device type changes. When the type of the external device 500 in connection with the display apparatus 200 is switched from the web camera device to the smart terminal device, since the two devices are suitable for different play modes, the play mode of the display apparatus 200 needs to be switched from the LLM to the HIQM.

In addition, when the display apparatus 200 cannot obtain the device information frames in the data stream, it means that the external device 500 and the display apparatus 200 has been disconnected at present, so that the play mode may be restored, namely switching back to the initial play mode. In this process, the display apparatus 200 may detect an extraction process of the device information frames within a plurality of continuous periods, so that the play mode is restored to the initial mode when the device information frames cannot be extracted from the data stream within a preset number of continuous periods.

In the above embodiments, the display apparatus 200 may determine whether the external device 500 supports the automatic control protocol by parsing the data stream, so that the play mode is set according to the automatic control protocol supporting capability of the external device 500. In some embodiments, in order to quickly obtain the automatic control protocol supporting capability of the external device 500, the supporting condition of the external device 500 in connection with the display apparatus 200 may be further saved through a manner of storing the device information; and when the external device 500 is in connection with the display apparatus 200, the protocol supporting condition of the external device 500 is determined by matching the stored information.

For example, the display apparatus 200 further includes a memory, and a device information table of the external device 500 may be stored in the memory. In the device information table, a device name and a protocol supporting condition of each external device 500 are saved as entries. When it is detected that the external device 500 is in connection with the display apparatus 200, the display apparatus 200 may automatically extract the device information table, and match a protocol supporting condition for the device name of the current external device 500 in the device information table. When it is determined by searching the device information table that the current external device 500 supports the ALLM protocol, the play mode is switched according to the ALLM protocol; and when it is determined through the device information table that the current external device 500 does not support the ALLM protocol, the device type of the external device 500 may be obtained through the SPD protocol frames, so that the play mode is switched according to the device type.

Determination of First Connection of Device.

For the external device 500 connected with the display apparatus 200 for the first time, since the device is connected for the first time, information of the current external device 500 is not stored in the device information table, so that the display apparatus 200 cannot find a match of a device name of the current external device 500 from the device information table, that is, the information of the external device 500 connected for the first time cannot be obtained through the stored device information. Therefore, in some embodiments, when the external device 500 is connected with the display apparatus 200, the display apparatus 200 may further determine whether the external device 500 is connected with the display apparatus for the first time.

Figure 15:
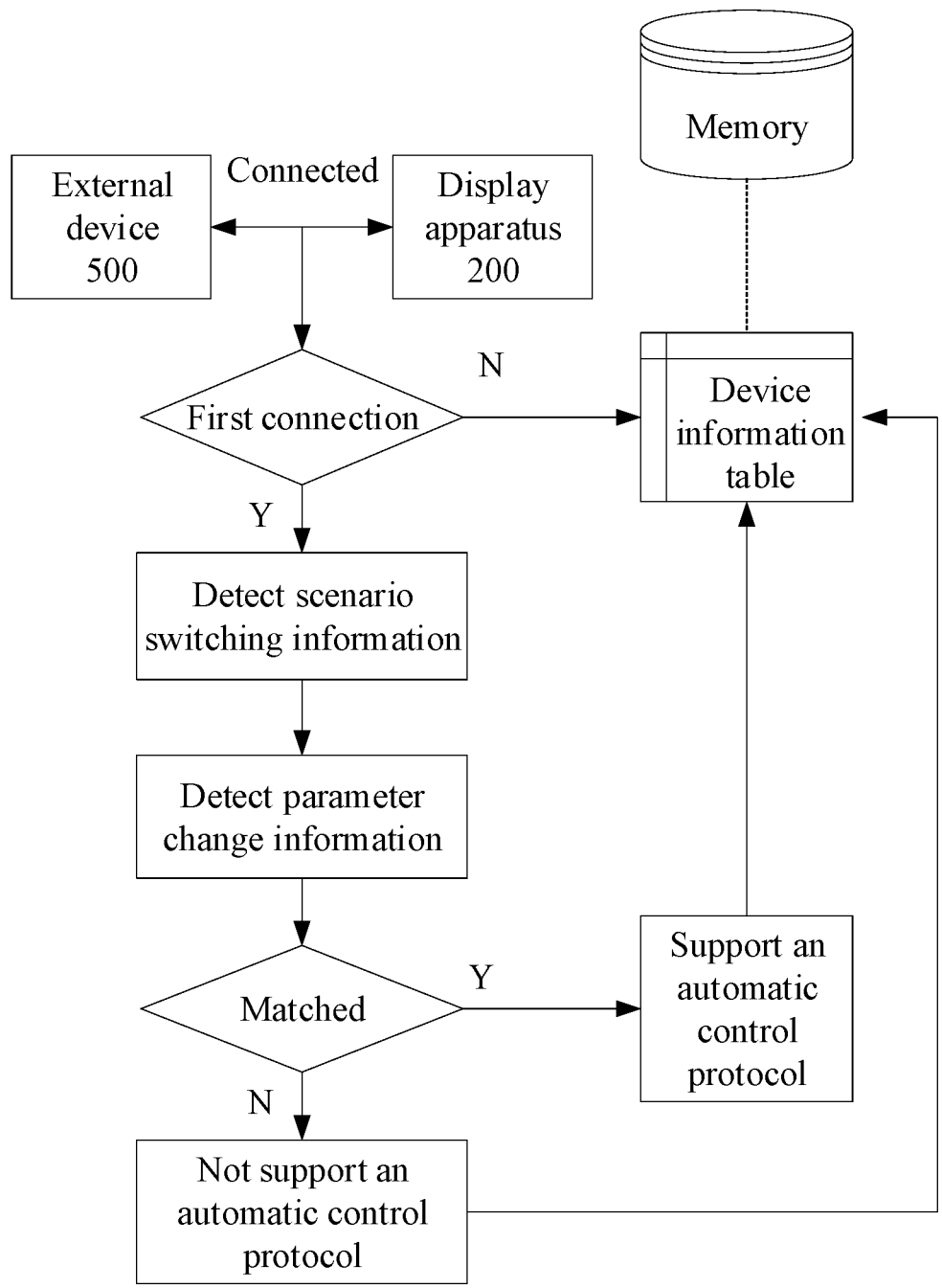
FIG. 15 is a schematic flow diagram of maintaining a device information table according to one or more embodiments of the present application.

As shown in FIG. 15, whether the external device 500 is connected for the first time may be determined by traversing the stored device information table, and when a traversing result is that the device name of the current external device 500 does not exist in the device information table, it is determined that the current external device 500 is connected for the first time; and when a traversing result is that the device name of the current external device 500 exists in the device information table, it is determined that the current external device 500 is not connected for the first time. For the external device 500 that is not connected for the first time, the display apparatus 200 may execute a corresponding play mode switching manner directly through the protocol supporting condition stored in the device information table.

For the external device 500 connected for the first time, the display apparatus 200 needs to start a protocol detection process to detect at least one protocol supported by the external device 500. The display apparatus 200 may extract device information data frames carried in the data stream and extract state values on specified marker bits from the device information data frames. For example, the ALLM protocol supporting condition may always exist in HDMI data frames as reserved bits, that is, the display apparatus 200 may read the state value in the area or field for indicating the ALLM in the data frames. When the state value for indicating ALLM is 0, it is determined that the current external device 500 does not support the ALLM protocol; and when the state value read on the specified marker bits is 1, it is determined that the current external device 500 supports the ALLM protocol.

After the ALLM protocol supported by the external device 500 is determined, the display apparatus 200 may further store the device name and the corresponding protocol supporting condition of the current external device 500 in the device information table as entries, such that when the external device 500 is connected with the display apparatus at a later time, the protocol supporting condition of the external device 500 may be determined directly through the device information table.

In the above embodiments, the display apparatus 200 may determine the protocol supporting condition of the external device 500 by reading the state value on the specified marker bits in the data frames. In a part of determining processes, data with a marker bit being 0 is still sent to the display apparatus 200 even if the external device 500 does not support the automatic control protocol, which conflicts with a 0/1 state when the automatic control protocol comes into force, so that the display apparatus 200 fails to directly determine whether the external device 500 truly supports the automatic control protocol.

In view of the above issue, in some embodiments, whether the current external device 500 supports the automatic control protocol may be further determined by analyzing a state value maintaining condition within a period of time. In other words, the display apparatus 200 may obtain scenario switching information of the external device 500 within a detection period and parameter change information of automatic control protocol marker bits in the data stream. If the scenario switching information matches the parameter change information, it is determined that the current external device 500 supports the automatic control protocol, so that control protocol supporting information indicating that the external device supports the automatic control protocol may be generated and stored.

For example, when the external device 500 at the source end is playing a video resource or staying on a home page, the display apparatus 200 at the Sink end will be not notified to enter the LLM, so that the state value of the ALLM is 0; and when the external device 500 at the source end is running a game, it is required to notify the display apparatus 200 at the Sink end to enter the LLM, so that the state value needs to be set as 1. Based on the above principles, the display apparatus 200 may automatically enable an ALLM protocol parsing thread when the external device 500 is connected for the first time, in this case, determine whether the current usage scenario is playing a game or playing a video resource through manners such as image recognition and artificial intelligence (AI) scene recognition, and record the change condition of the state value of the ALLM. If the scenario switching information matches the parameter change information, it indicates that the current external device 500 may maintain the marker bit correctly, that is, it indicates that the current external device 500 supports the ALLM protocol, otherwise, the current external device 500 does not support the ALLM protocol.

It can be seen that in the above embodiments, the display apparatus 200 may record the protocol supporting condition of the external device 500 in real time by maintaining the device information table, so that whether the external device 500 supports the automatic control protocol may be determined by parsing the data stream from the external device 500. For example, the above process needs to be performed on all the external devices that are in connection with the display apparatus 200 for the first time, ALLM supporting conditions of the external devices 500 are recorded respectively, and thus the display apparatus 200 may distinguish the conditions through the SPD data frames from the external devices 500.

It should be noted that, by analyzing the data stream, a determination result for the protocol supporting condition of the external device 500 determined by the display apparatus 200 may indicate that the external device 500 does not support the automatic control protocol at all, and may also indicate that the external device 500 does not support the automatic control protocol at the current moment. For example, due to user settings, an ALLM switch of the current external device 500 is in Off state, and when the current external device 500 is in connection with the display apparatus 200 later, a user may set the ALLM switch to On state, that is, the ALLM function is enabled. Therefore, in order to enable the external device 500 supporting the automatic control protocol to control and switch the play mode of the display apparatus 200 through the automatic control protocol, for the external device 500 that is not connected for the first time, the display apparatus 200 may further update the stored device information table through periodic detection.

When the device information table is used as the basis for determining the protocol supporting conditions of the devices, an on-off state of the external device 500 further needs to be considered, to avoid the on-off state from affecting the determining process. For example, when whether the external device 500 supports the ALLM protocol is detected, if the state value for indicating the ALLM is read as 1, it means that the current external device 500 supports the ALLM protocol, but in later use, the external device 500 is set by a user to shut down the ALLM protocol. In other words, although it is recorded in the device information table that the external device 500 supports the ALLM protocol, in a later connection process, as the ALLM protocol switch is turned off, switching of the play mode cannot be controlled according to the ALLM protocol in this playing process, and the device type still needs to be determined by using the SPD data frames so as to switch the play mode.

Therefore, in some embodiments, when the external device 500 and the display apparatus 200 are connected, if it is determined that the current external device 500 is not connected with the display apparatus 200 for the first time, different image quality and sound quality adjusting programs may be further executed according to the on-off state of the ALLM.

For example, when the ALLM switch is in the On state, the display apparatus 200 may detect the ALLM state change of the external device 500 in real time through a thread cycling body, and if the ALLM state changes into 1, the video data and/or audio data from the external device 500 are further obtained, so that the usage scenario of the external device 500 is detected according to the data. In the detect process, the display apparatus 200 may obtain a game picture of the external device 500 at this moment and perform image analysis and processing on the game picture to determine a game type to which the current game picture belongs, and different image quality and sound quality parameters are set according to different game types. For example, for the game types, such as shooting game, sports game and action game, the latency of a game picture needs to be lowered to achieve the smoother game experience. If the ALLM state changes into 0, the above image quality and sound quality processing may be stopped to resume image quality and sound quality parameters to user-customized values, to guarantee the normal viewing experience for a user.

When the ALLM switch is in the Off state, as the display apparatus 200 cannot obtain the usage scenarios of the external devices 500 directly through the ALLM protocol, SPD information of the external devices 500 may be obtained. In other words, if the data stream from the external devices 500 carry the SPD information, the SPD information may be parsed to obtain the device types of the external devices 500 first, and then different image quality and sound quality adjusting manners are selected according to the different types of the external devices 500. For example, by parsing the SPD information, the display apparatus 200 may determine whether the external device 500 is a gaming device. If the external device 500 is the gaming device, a game type of the game that is running at present may be determined according to a game picture, and the image quality and sound quality parameters are set according to the game type. If the external device 500 is not the gaming device, the image quality and sound quality parameters may be restored to user-customized values, to guarantee the normal viewing experience for a user.

It can be seen that in the embodiments, for the external device 500 supporting the automatic control protocol, corresponding play mode switching manners may be performed according to different on-off states, so that the display apparatus 200 can determine the usage scenario of the external device 500 automatically and adjust a working mode of the display apparatus 200 according to the usage scenario of the external device 500, to achieve linkage of the image quality effect and sound quality effect of the display apparatus 200 with the usage scenario of the external device 500, and achieve a better user experience.

Image Quality Parameter Setting.

In some embodiments, when the image quality parameters are set, the corresponding image quality parameters may be further obtained by calling history information. For example, the display apparatus 200 may record an image mode set by a user before automatically entering a game mode, and set the corresponding image mode parameters after automatically entering the game mode. If the user manually changes the image mode parameters in the case of automatically entering the game mode, the display apparatus 200 further needs to memorize an image mode set by the user. For different game modes, the display apparatus 200 may further record corresponding image mode parameters of the game modes. For example, the display apparatus 200 may recognize a game image type to automatically set modes such as a standard dynamic range (SDR) game, a high dynamic range (HDR) mode and a Dolby game.

In addition, in the game process, the display apparatus 200 may further recognize picture information of a game in real time to distinguish game types, so that basic image quality parameters are changed in the game mode to achieve the better game experience. To obtain a better user experience, when a user pulls up a game machine from the display apparatus, the game mode will not exit actively, but it waits for connection of the next device. Then a type of the newly connected device is determined, the game mode does not need to exit if the device is a game machine, and it is switched to the image mode which is set by the user last time if the device is a device of other types, such as a set top box.

To obtain the above effect, in some embodiments, the display apparatus 200 may set a game mode label after entering the game mode, that is, "setGameModeFlag=true" is set, then a game image type to be set is determined according to the image mode type, and if the image type to be set is the same as the current mode, the game mode is saved. Then setting of the image mode is completed by setting an image mode (picmode) of a hardware abstraction layer (HAL) and updating backlight and image parameters as well as a dynamic contrast curve.

In addition, in the game process, the display apparatus 200 may further determine whether a current image is in a variable refresh rate (VRR) mode, and if it is in the VRR mode, whether a previous game process is the VRR mode and whether the game mode changes are determined through memorized data, so that an output mode is set to be a PC, the play mode is set to be the LLM, and a mode identification is updated for being called in subsequent games. In the process of setting the image mode, a corresponding image quality processing algorithm may be further set according to the game mode, for example, based on whether it is an image mode, whether to perform frame interpolation, motion estimation and motion compensation, noise reduction processing, conversion of SDR mode and HDR mode and other processing in the game process is set.

In some embodiments, the switching manner of the play mode may be actively controlled through the manual or automatic manner, that is, after the display apparatus 200 switches the play mode, the usage scenario of the external device 500 may be further monitored in real time, and the play mode is switched again according to the change of the usage scenario. For example, when the display apparatus 200 automatically switches the play mode through the ALLM protocol frames or the SPD device information frames, automatic switching of the play mode may be stopped under the following four conditions: manually switching the image mode by a user; switching a signal source; pulling the external device 500 from the display apparatus 200; and ALLM/SPD drive control of the external device 500.

When a set state of the display apparatus 200 is detected, it may be controlled to return to an initial play mode, and complete a corresponding control flow. For example, in the process of using the display apparatus 200, whether the display apparatus 200 has entered the game mode may be determined after it is in the above four scenarios, if yes, a system on chip (SOC)/frame rate conversion (FRC) game mode exits first, a game mode flag is reset, and then a corresponding exit flow is executed, such as an image mode switching flow, a signal source switching flow, a device pull-out flow, an image parameter restoration flow, etc.

In the above embodiments, the display apparatus 200 may automatically adapt to a usage scenario of the external device 500 through configuration to switch the play mode. By configuring control programs in the at least one processor 250 of the display apparatus 200, after obtaining the data stream from the external device 500, the display apparatus 200 parses the control protocol supported by the current external device 500 from the data stream. If the external device 500 supports the automatic control protocol, the play mode is switched according to what is specified in the data stream; and if the external device 500 does not support the automatic control protocol, the play mode is switched according to the device type of the external device.

Figure 16:
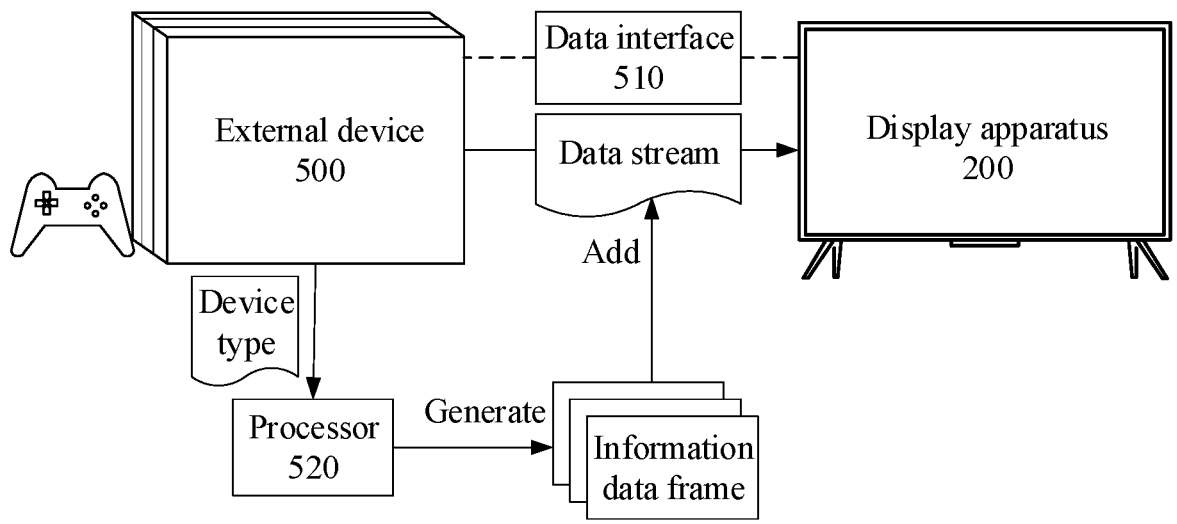
FIG. 16 and FIG. 17 are schematic flow diagrams of play control of an external device according to one or more embodiments of the present application.

In order to enable the display apparatus to realize the above function, as shown in FIG. 16, some embodiments of the present application further provide an external device 500, including: a data interface 510, at least one processor 520 and a memory. The data interface 510 is configured to be connected with the display apparatus 200. The memory is configured to store instructions and data. The at least one processor 520 is configured to execute the instructions to cause the display apparatus to: obtain a to-be-played data stream and a type of the external device 500, and generate device information frames according to the device type; and then add the device information frames into the data stream to be sent to the display apparatus, so that the display apparatus switches a play mode to a mode adaptive to the device type.

The external device 500 in the above embodiments may generate the device information frames including the device type by detecting its own device type after the external device 500 establishes a connection with the display apparatus 200, and add the device information frames into the data stream, so that the device information frames are sent to the display apparatus 200 together with the data stream, such that the display apparatus 200 may switch the play mode according to the device type of the external device 500. The external device 500 may enable, by configuring a simple control program, the display apparatus 200 to obtain the device type to automatically switch the play mode, thereby improving the output effect of the data stream.

Figure 17:
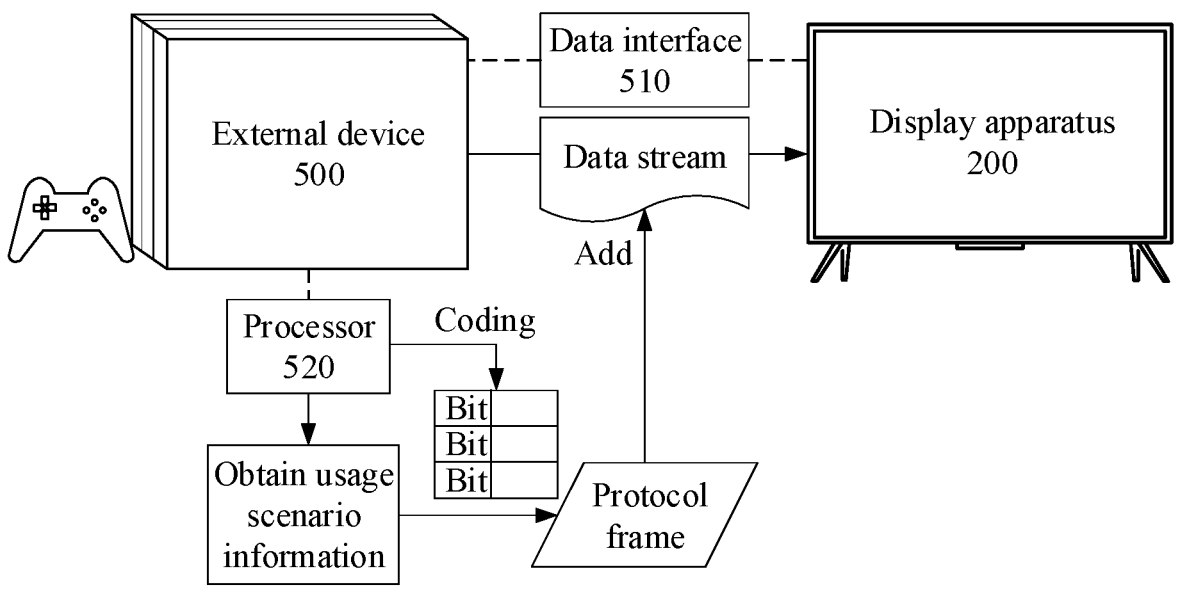

In order to enable the display apparatus to achieve the above function, as shown in FIG. 17, some embodiments of the present application further provide an external device 500, including: a data interface 510, at least one processor 520 and a memory. The data interface 510 is configured to be connected with the display apparatus 200. The memory is configured to store instructions and data. The at least one processor 520 is configured to execute the instructions to cause the display apparatus to: send a data stream to the display apparatus 200 and add data information into the data stream according to the external device's own supporting condition for an automatic control protocol; if the external device 500 supports the automatic control protocol, add usage scenario information into the data stream to control the display apparatus 200 to switch a play mode according to the usage scenario information; and if the external device 500 does not support the automatic control protocol, add a device type into the data stream to control the display apparatus 200 to switch the play mode according to the device type.

The external device 500 in the above embodiments may be connected with the display apparatus 200 through the data interface 510 and send the data stream to the display apparatus 200, and meanwhile, the external device 500 may also add data frames for describing device information into the data stream according to its own supporting condition for the control protocol. When the external device 500 supports the automatic control protocol, the usage scenario information is added into the data stream; and when the external device 500 does not support the automatic control protocol, the device type information is added into the data stream, to control the display apparatus 200 to switch the play mode according to the usage scenario or the device type, so as to obtain the better audio and video output effect.

Game Theme.

Since both the display apparatus 200 and the external device 500 have respective independent operating systems, after the display apparatus 200 and the external device 500 are connected, on the one hand, the display apparatus 200 as the Sink end may output the data stream from the external device 500, and on the other hand, the display apparatus 200 may further execute an interaction operation according to its own operating system. For example, a user may implement the interaction operation by a control device 100 such as a remote control and a mobile phone, and the display apparatus 200 may receive various instructions from the control device 100 in real time in the output process of the data stream. When the user presses a "menu" button in the control device 100, the display apparatus 200 may display a control menu. A plurality of control options such as an "image mode", a "sound mode", a "display range", a "zoom mode", an "HDMI version" may be set in the control menu, and the user may select any one control option by a further operation through the control device 100. In this case, the display apparatus 200 may further display a corresponding user interface to control an output manner of the display apparatus 200.

Figure 18:
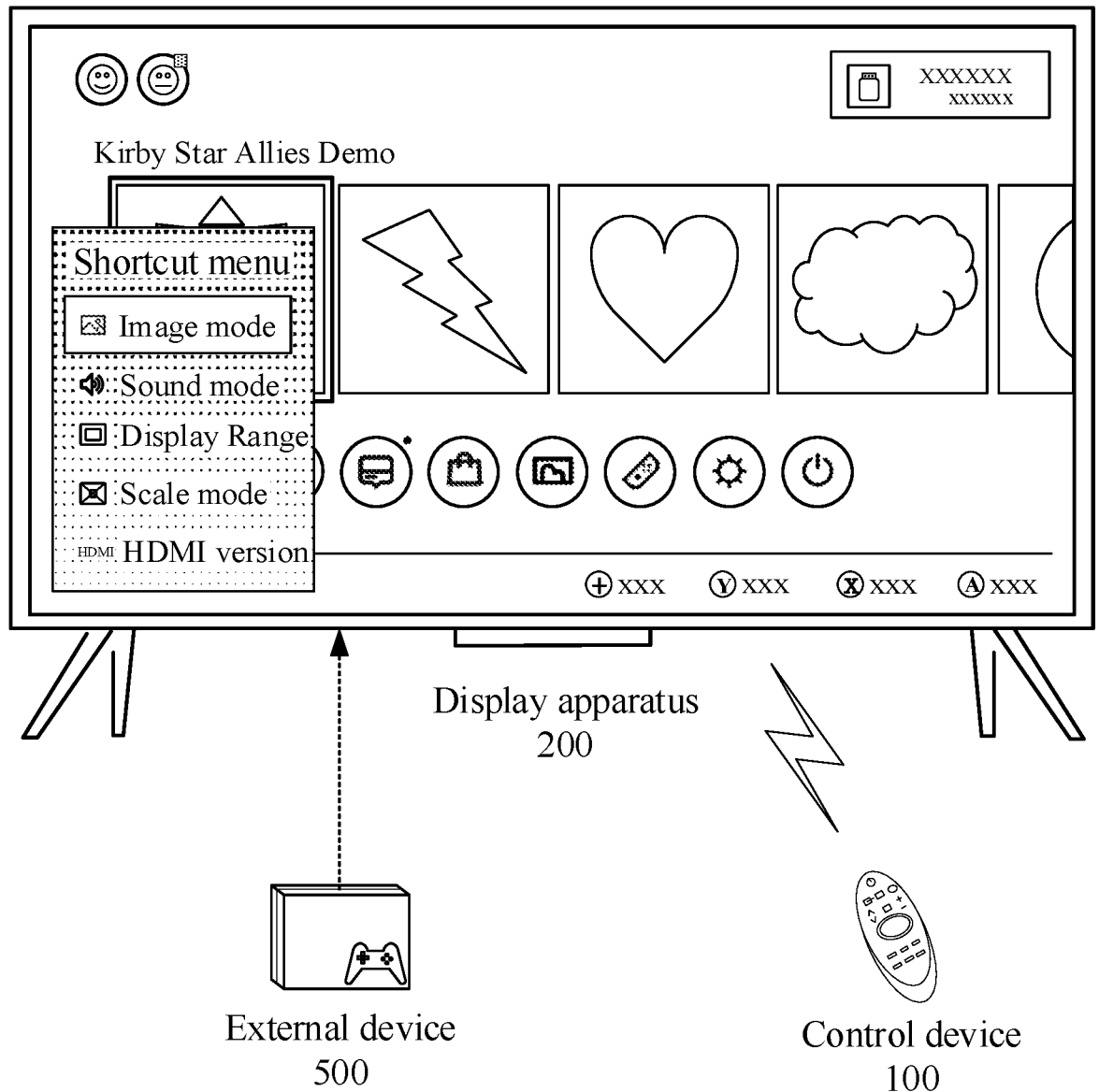
FIG. 18 is a schematic diagram of a control menu according to one or more embodiments of the present application.

Contents, such as the control menu, presented on the display apparatus 200 in an interaction process may be presented as a particular interface style according to a user interface theme of the operating system. For example, as shown in FIG. 18, for the display apparatus 200 such as a smart television, the control menu may be presented as a light-blue gradient background form.

As the user interface theme is typically set by a user through the operating system of the display apparatus 200, after the display apparatus 200 and the external device 500 are connected, the user interface theme is still displayed according to a set form in the operating system. Therefore, the user interface theme is single in form, and when the display apparatus 200 outputs the data stream from the external device 500, a theme style of the control menu and a video picture style are mismatched, which is not convenient for the user to distinguish and lowers the interaction experience. For example, when a user connects a game machine into the display apparatus 200, a game picture may also be in the blue gradient background form, so that the control menu and a background color cannot be distinguished obviously, which is not easy for user operations. In some cases, the game picture may also mismatch with the control menu in style, resulting in an inharmonious overall display effect.

In order to facilitate user operations and improve user experience, some embodiments of the present application provide a display apparatus 200, the display apparatus 200 includes a display 275, an external device interface 240, at least one processor 250 and a memory. The external device interface 240 is configured to be connected with an external device 500, and the display 275 is configured to display a user interface and display media resource data pictures from the external device 500. The memory is configured to store instructions and data associated the display. The at least one processor 250 may be further configured to execute the instructions to cause the display apparatus to perform a method for updating the user interface theme, so that a user interface theme of the display apparatus 200 may be updated according to contents from the external device 500, to obtain a user interface style which is more convenient to operate and/or more harmonious.

Figure 19:
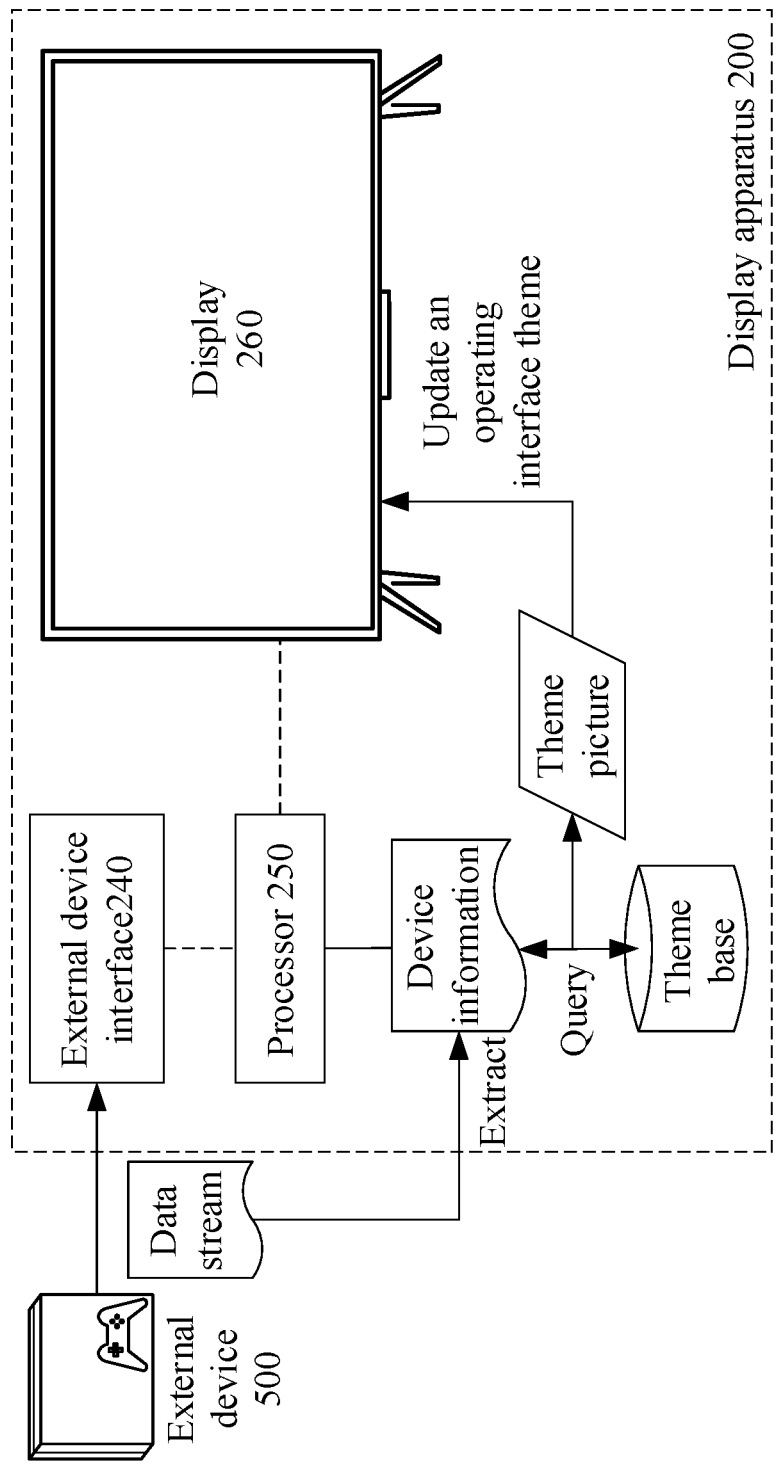
FIG. 19 is a schematic flow diagram of a method for updating the user interface theme according to one or more embodiments of the present application.

Specifically, as shown in FIG. 19, the display apparatus 200 may receive a data stream from the external device 500 after the external device 500 is connected to the external device interface 240. The data stream received by the display apparatus 200 includes video data, audio data and auxiliary information data related to data output. The external device 500 may form the data stream through a plurality of continuous frames; and after receiving the data stream, on the one hand, the display apparatus 200 may parse the data stream to obtain media resource data such as the video data and the audio data to form a specific video image and a sound signal, and on the other hand, the display apparatus 200 may further extract auxiliary information related to the data output process from the data stream to control a media resource output process in real time.

For example, the display apparatus 200 may extract information related to the current external device 500 and including information such as a device name and a device type from device information frames in the media resource data, and adjust a play mode through the extracted information to adapt to a usage scenario of the external device 500 or send some control instructions to the external device 500. For the external device 500 supporting an automatic control protocol, the display apparatus 200 may further extract related control instructions based on the automatic control protocol from the data stream to switch the play mode according to the control instructions.

After receiving the data stream from the external device 500, the display apparatus 200 may further extract device information from the data stream. The device information includes the device type and a current usage scenario of the external device 500. The device type may be classified according to actual functions of the external device 500, for example, the external device may be divided into a gaming device, a multimedia device, etc. As some external devices 500 have multiple functions, the device type may further include a multifunctional device, a smart terminal device, etc.

The device type may be obtained by reading the device information frames in the data stream, or obtained by analyzing the video data and audio data contents in the data stream as well as information such as related interface data and the device name. The display apparatus 200 may extract contents such as the device name, manufacturer information, a mac address, an interface specification and audio and video data formats from the received data stream, to comprehensively determine the device type. For example, by reading the device information frames of the external device 500, it may be obtained that the type of the external device 500 is a "gaming device". When a specific gaming device needs to be determined, related information may be further extracted, including: a device name "game machine 360", manufacturer information "Microsoft", a mac address "XX-XX-XX-XX-XX-XX", and an interface specification "HDMI". Therefore, it may be determined through queries that a gaming device which matches with the above related information is "x-box 360", so that more device information of the external device 500 is obtained.

The display apparatus 200 may further monitor the current usage scenario of the external device 500 in real time through the data stream. The usage scenario may be obtained by reading protocol frames in the data stream, or obtained by performing scenario recognition on a display image in the data stream. Due to different external devices 500, the corresponding usage scenarios that can be supported are different, and some of the external devices 500 may support a plurality of usage scenarios. For example, a computer device, a smart terminal and the like can provide a game scenario, an instant communication scenario and the like in use. These external devices 500 may also switch the different usage scenarios in use, and thus are called multi-mode devices. Some external devices 500 only support a single usage scenario, such as a game machine, a set top box and a multimedia player; and these external devices 500 generally do not switch or barely switch the usage scenarios in use, and thus are called single-mode devices.

For the single-mode device, after the device type is determined, its corresponding usage scenario may be directly determined. For example, for the external device 500 with the device type being the gaming device, its corresponding usage scenario is usually the game scenario. For the external device 500 with the device type being the multimedia device, its corresponding usage scenario is usually a movie scenario. The multi-mode device may be in different usage scenarios under different usage time or usage conditions. For example, for the external device 500 with the device type being the smart terminal device, when running a game application, a corresponding usage scenario is the game scenario; and when playing a video resource, a corresponding usage scenario is the movie scenario.

On the one hand, after obtaining the device information, the display apparatus 200 may switch the play mode according to the usage scenario in the device information, for example, when it is determined that the current usage scenario of the external device 500 is the game scenario, the play mode is switched to an LLM; and when it is determined that the current usage scenario of the external device 500 is the movie scenario, the play mode is switched to an HIQM. On the other hand, after obtaining the device information, the display apparatus 200 may extract a theme picture according to the device information. The theme picture may be a picture, for a mainstream device and a main usage scenario, which is made in advance by the display apparatus 200 according to a menu size; and for the different external devices 500 and the different usage scenarios, the display apparatus 200 may set a plurality of theme pictures matching the display apparatus and store the theme pictures in a local database or a cloud database.

Based on this, in a process of extracting the theme picture, the display apparatus 200 may query in the local database and the cloud database in sequence according to the device information, to obtain the theme picture according with the device information. The display apparatus 200 may generate a query instruction according to the device information, call the local database in response to the query instruction, and query the theme picture matching the device information in the local database; and when the theme picture matching the device information is not found in the local database, the display apparatus 200 may further send the query instruction to a cloud server to request the cloud server to find a match of a theme picture adaptive to the current device information in the cloud database.

For example, the display apparatus 200 may extract the device information of the current external device 500 from the data stream, that is, the device type is the gaming device and the usage scenario is running a game "Game X", and then a query instruction may be generated according to the device information to make the display apparatus 200 query theme pictures related to the "Game X" in the local database, such as a game poster, a game screenshot or other war type pictures similar to the game in dominant hue or style. When a theme picture related to the "Game X" is matched in the local database, the related picture is directly extracted to be used for rendering the user interface theme of the display apparatus 200.

When a theme picture related to the "Game X" is not matched in the local database, the display apparatus 200 may send the query instruction to the cloud server to request the cloud server to query related theme pictures. In other words, after receiving the query instruction, the cloud server may match game posters, game screenshots or other war type game pictures similar to the Game X in the cloud server according to the specified game scenario "Game X" in the query instruction. Finally, the cloud server sends the matched theme picture to the display apparatus 200 again to enable the display apparatus 200 to extract the theme picture.

The theme picture may include a background pattern and a foreground figure that are used for constituting the control menu, and when the theme picture is obtained through queries, the display apparatus 200 may render the control menu according to the background pattern and the foreground figure corresponding to the theme picture. Different theme styles may be rendered with different theme pictures. For example, when the external device 500 is the gaming device, the display apparatus 200 may query a game theme picture according to the device information. The game theme pictures may be a background pattern generated based on a cover pattern of a certain game and a plurality of foreground figures same as or similar to a dominant hue of a game cover. A user interface according with the game scenario may be rendered by combining the foreground figure and the background pattern, so as to update the user interface theme according to the theme picture.

It can be seen that in the above embodiments, the display apparatus 200 may query the theme picture adaptive to the usage scenario of the current external device 500 by extracting the device information in the data stream and then render the control menu according to the theme picture, so that the style of the user interface is consistent with the style of a display picture in the data stream, which is convenient for a user to perform the interaction operation, thereby improving user's experience.

Figure 20:
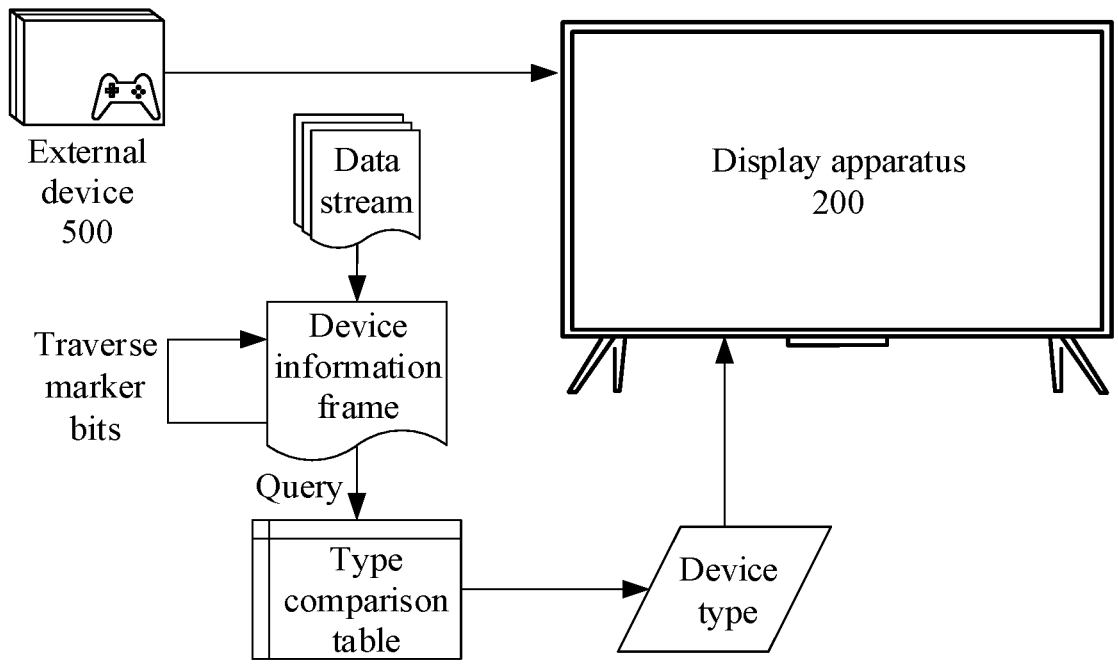
FIG. 20 is a schematic flow diagram of extracting a device type from a data stream according to one or more embodiments of the present application.

In order to extract the device information from the data stream, as shown in FIG. 20, in some embodiments, the display apparatus 200 may obtain the device information frames from the data stream. The device information frames are frame data from the external device according to a basic transmission protocol. For example, an SPD data frame for describing its own device information is specified in the HDMI protocol, and the external device 500 may send the SPD data frame according to a preset time interval while transmitting the media resource information data.

Then, the display apparatus 200 reads the device type by traversing state values of specified marker bits in the device information frames, for example, after the SPD data frames are received, a device classification on a particular byte (marker bit) is read from the SPD data frames, for example, the 25th byte (data byte 25) in the SPD data frames is the device classification, its corresponding state value "8" represents a "gaming device", "9" represents a "host device", and "10" represents a "DVD device", and so on. When a device classification value on a particular byte position is read as "8", it represents that the external device 500 in connection with the display apparatus 200 is a game machine, and the game machine is usually used for games, so that the play mode may be switched to the LLM.

In order to determine the device type of the external device 500 according to the state values on the marker bits, when obtaining the state value on the marker bit through traversing, the display apparatus 200 may call a type comparison table, and query the device type of the current external device in the type comparison table according to the state value obtained through traversing. The type comparison table may be maintained by the display apparatus 200 or a cloud service provider of the display apparatus 200, and the type comparison table may include a plurality of state values and a device type indicated by each state value.

Since products supporting an SPD data frame protocol are popular, and mainstream external devices 500 can all send the SPD data frames, the device type information of the external device 500 may be obtained through the SPD data frames. For more precise determination, other auxiliary information (such as manufacturer information and model information) may also be extracted from the SPD data frames to determine the device type.

The device type extracted from the device information frames may be used for the display apparatus 200 to switch the play mode. For example, according to usage habits of users, a main usage scenario of a gaming type device is the game scenario, a main usage scenario of the smart terminal device is content cast, and both scenarios above require the effect of the lower picture transmission latency, namely requiring switching to the LLM; while other types of devices, such as a set top box and a DVD are mainly used for a movie watching scenario, which requires switching to the HIQM in this case.

The display apparatus 200 may preliminarily determine a user interface theme updating process according to the device type, such that the display apparatus 200 only executes user interface theme updating for some types of external devices 500. Since multiple types of external devices 500 can be connected with the display apparatus 200, data streams from some types of external devices 500 include particular interaction interfaces. For example, when the display apparatus 200 detects that the device type of the external device 500 is a gaming device, the gaming device may present interaction interfaces such as a game list and an in-game operation list during running of a game and these interaction interfaces have unique interface styles, so that when the display apparatus 200 outputs the interaction interfaces, the display apparatus 200 needs to update a theme of a user interface to make the user interface of the display apparatus 200 and the current interaction interface of the external device 500 match in style.

Data streams from some external devices 500 do not contain interaction interfaces. For example, the device type of the external device 500 is a camera device, the camera device only sends recorded video data to the display apparatus 200 in use and typically does not have a unique interaction interface style, and thus the display apparatus 200 directly performs displaying according to an initial theme without updating the user interface theme.

Figure 21:
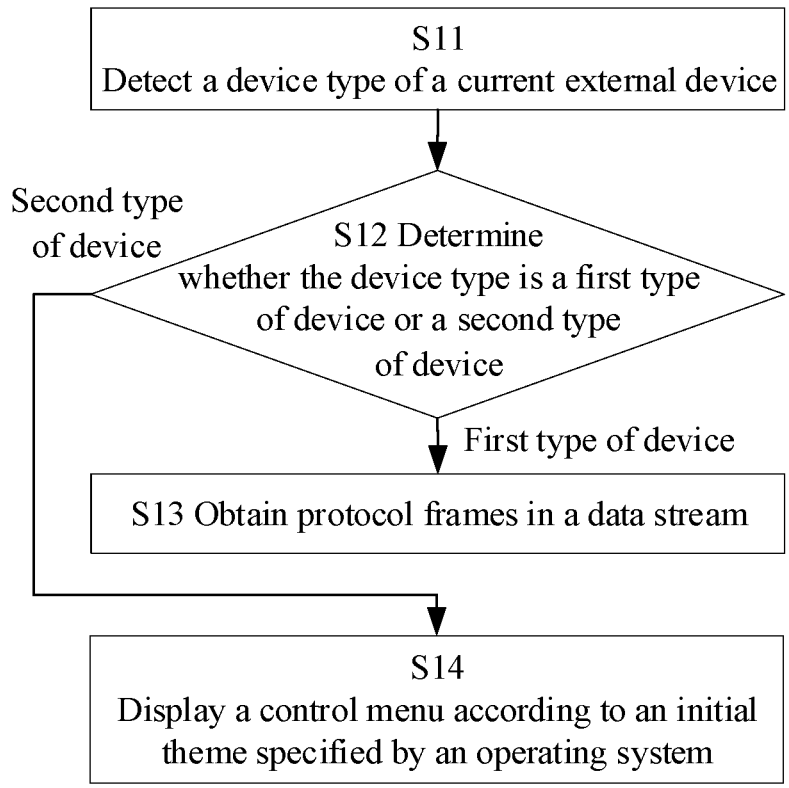
FIG. 21 is a schematic flow diagram of detecting a type of an external device according to one or more embodiments of the present application.

Therefore, as shown in FIG. 21, in some embodiments, after the display apparatus 200 obtains the device type of the external device 500, the display apparatus 200 may further determine the device type, and if the device type is a first type of device which needs to update a user interface theme, subsequent steps may be executed to extract a current usage scenario from the data stream so as to obtain the device information. If the device type is a second type of device which does not need to update a user interface theme, the display apparatus 200 may stop updating the user interface theme, and maintain a set user interface theme form in the operating system of the display apparatus 200 for displaying.

Specifically, as shown in FIG. 21, in some embodiments, the process that the display apparatus 200 detects a device type of a current external device includes: S11, detecting a device type of a current external device; S12, determining whether the device type is a first type of device or a second type of device; S13, in response to the device type being the first type of device, obtaining protocol frames in a data stream; and S14, in response to the device type being the second type of device, displaying a control menu according to an initial theme specified by an operating system.

Figure 22:
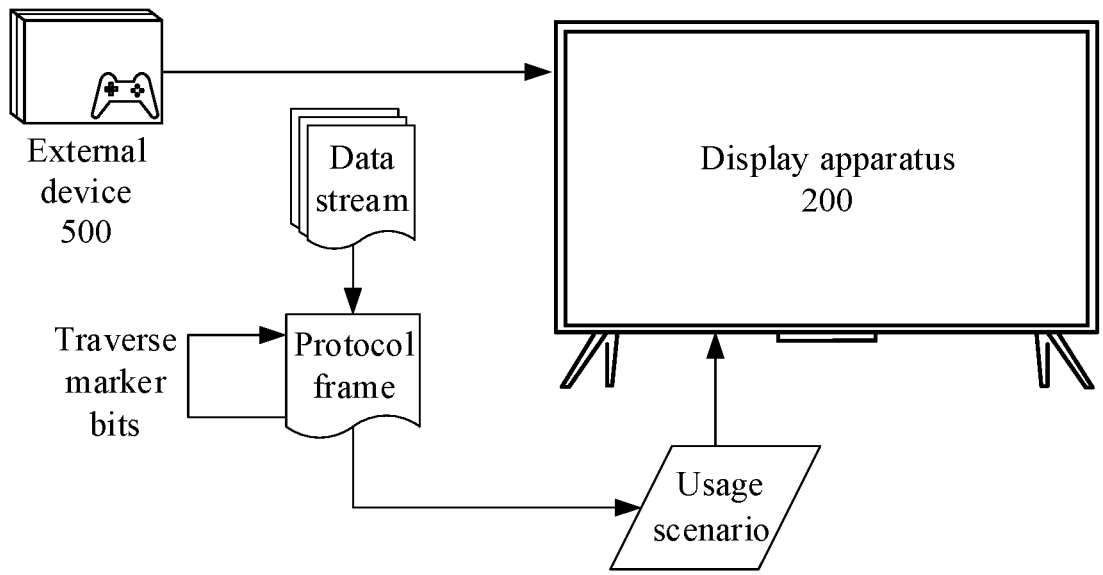
FIG. 22 is a schematic flow diagram of extracting a usage scenario from a data stream according to one or more embodiments of the present application.

For the first type of device which needs to update the user interface theme, the display apparatus 200 may further extract the usage scenario of the current external device 500 from the data stream. As shown in FIG. 22, in some embodiments, the display apparatus 200 may obtain the protocol frame in the data stream, and traverse the state values of the marker bits in the protocol frame to detect current usage scenario information of the external device according to the state values. The protocol frame is frame data from the external device according to the automatic control protocol, for example, the protocol frame may be a frame of data from the external device 500 based on ALLM protocol. In the ALLM protocol frame, the usage scenario of the current external device 500 may be indicated in the specified marker bit through the state value.

The display apparatus 200 may determine the usage scenario of the current external device 500 by traversing the state values of the marker bits in the protocol frame. For example, the display apparatus 200 may extract the ALLM protocol frame from the data stream and read an ALLM state parameter in the protocol frame. If the ALLM state parameter is a first value, such as 1, it represents that the current external device 500 is in the game scenario and the play mode is switched to the LLM. If the ALLM state parameter is a second value different from the first value, such as 0, it represents that the current external device 500 is in a non-game scenario and the play mode is switched to the HIQM.

For the external device 500 supporting multiple usage scenarios, the current usage scenario information may be further transferred to the display apparatus 200 by setting the state values of reserved marker bits in the protocol frame. For example, for a computer device, two bits reserved in the HDMI specification may be utilized to indicate a usage scenario, that is: Rsvd1=0 and Rsvd0=0 indicate the game scenario; Rsvd1=0 and Rsvd0=1 indicate the instant communication scenario; Rsvd1=1 and Rsvd0=0 indicate an office scenario; and Rsvd1=1 and Rsvd0=1 indicate a sports scenario.

Therefore, by periodically obtaining the protocol frame data and traversing the state values in a plurality of bits in the protocol frame data, the display apparatus 200 may read the current usage scenario information according to a combination of the state values in the plurality of bits. For example, the display apparatus 200 may extract the protocol frame data from the data stream at an interval of 1 s and read the state values on two bits specified by an extension protocol. When Rsvd1=0 and Rsvd0=0 are read, it is determined that the computer device is in the game scenario at present. When Rsvd1=1 and Rsvd0=1 are read, it is determined that the computer device is in the sports scenario such as watching a ball game at present.

Figure 23:
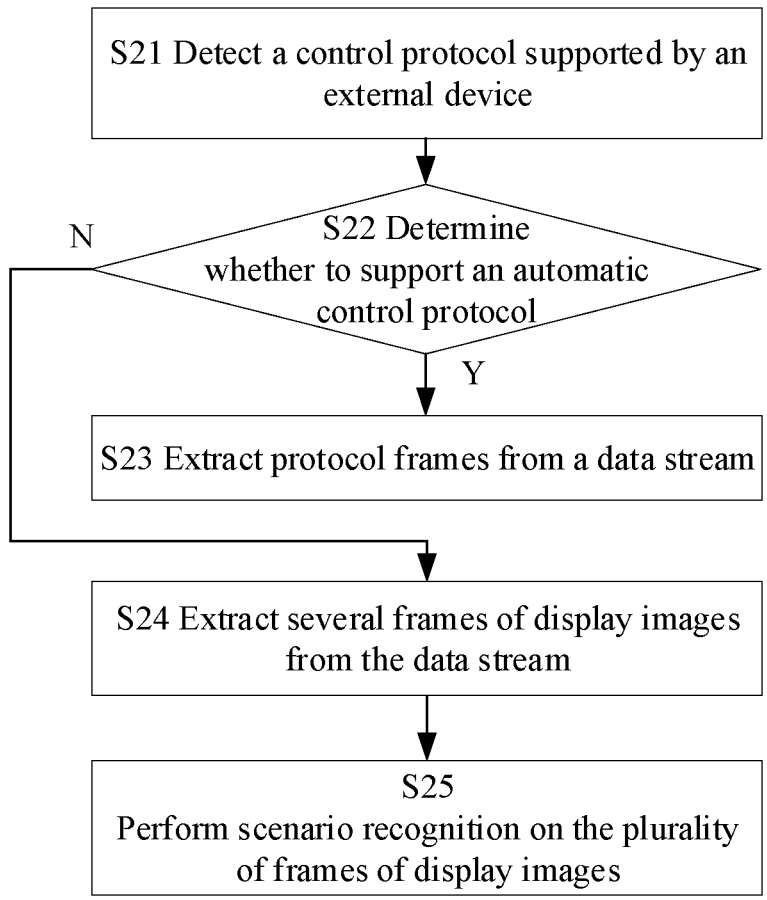
FIG. 23 is a schematic flow diagram of detecting a control protocol supported by an external device according to one or more embodiments of the present application.

It can be seen that, the usage scenarios of the multi-mode external device 500 may be obtained by reading the state values in the marker bits from the protocol frame, so that different theme pictures are queried according to different usage scenarios to update the user interface theme. However, for some external devices 500 not supporting the automatic control protocol, the display apparatus 200 cannot obtain the protocol frame from the data stream, or the protocol frame obtained from the data stream does not contain effective device information, that is, the device information cannot be extracted from the data stream. For this, as shown in FIG. 23, in some embodiments, in the process of extracting the usage scenario, the display apparatus 200 performs a step of detecting a control protocol supported by the external device 500, including: S21, detecting a control protocol supported by the external device 500, S22, determining whether to support an automatic control protocol; S23, in response to the external device 500 supporting the automatic control protocol, extracting the protocol frame from the data stream and traversing the state values of the marker bits in the protocol frame to determine the current usage scenario of the external device 500, S24, in response to the external device 500 not supporting the automatic control protocol, extracting several frames of display images from the data stream, and S25, performing scenario recognition on the plurality of frames of display images to obtain the current usage scenario information of the external device 500.

In order to achieve scenario recognition, the display apparatus 200 may extract the display images from the data stream and input the extracted display images to a scenario recognition model, to obtain scenario information output by the scenario recognition model. The scenario recognition model is a neural network model obtained by training according to sample images. The sample images are images for training, including the display images in the plurality of usage scenarios supported by the external device 500 and a usage scenario label corresponding to each display image. As a classification model, after the display images are input, the scenario recognition model may calculate a classification probability of the display images through a neural network algorithm inside the mode, that is, the usage scenarios to which the display images belong.

Apparently, before detection of the automatic control protocol is executed, a scenario recognition model may be constructed in the display apparatus 200. For example, the scenario recognition model may be obtained by training the neural network model, that is, an initial model may be constructed first, and then the sample images are input to the initial model one by one to obtain an output result of the model; afterwards, the output result of the model is compared with label information to determine a classification error; and model parameters are adjusted by performing back propagation using the classification error. Based on this, by inputting a certain quantity of sample images multiple times, the model parameters may be adjusted step by step to finally obtain the scenario recognition model with high accuracy.

After the scenario recognition model is constructed, the display apparatus 200 may input the display images extracted from the data stream to the scenario recognition model so as to obtain a scenario recognition result. According to different types of the external devices 500 connected with the display apparatus 200, the recognition result output from the scenario recognition model may also have different categories. For example, for the gaming device, the usage scenario information that may be output from the scenario recognition model includes the game scenario and the non-game scenario; and for the computer device, the usage scenarios that may be output from the scenario recognition model include the game scenario, the instant communication scenario, the office scenario and the sports scenario. Therefore, when scenario recognition is performed, different scenario recognition models may be called for different types of external devices 500 to obtain adaptive scenario classifications.

In order to detect the control protocol supported by the external device 500, when the external device 500 is connected for the first time, the display apparatus 200 may determine whether the current external device 500 supports the automatic control protocol by detecting whether the external device 500 can maintain the state values of the marker bits in the protocol frame. In other words, the display apparatus 200 may automatically enable an ALLM protocol parsing thread during first connection, meanwhile, determine the current usage scenario through manners such as image recognition and AI scene recognition, and record the change condition of an ALLM Mode marker bit. If scenario switching information matches parameter change information, it indicates that the current external device 500 may maintain the marker bit correctly, that is, the current external device 500 supports an ALLM function, otherwise, the current external device 500 does not support the ALLM function.

The display apparatus 200 may further update different user interface themes under different usage scenarios for the same external device 500, so that the user interface theme is adaptive to a picture input from the external device 500 to the display apparatus 200. For example, for the gaming device connecting with the display apparatus 200, when the gaming device runs a game, the user interface theme of the display apparatus 200 may be updated to adapt to a game interface; and when the gaming device does not run a game, the user interface theme of the display apparatus 200 may be updated to adapt to a main interface.

Figure 24:
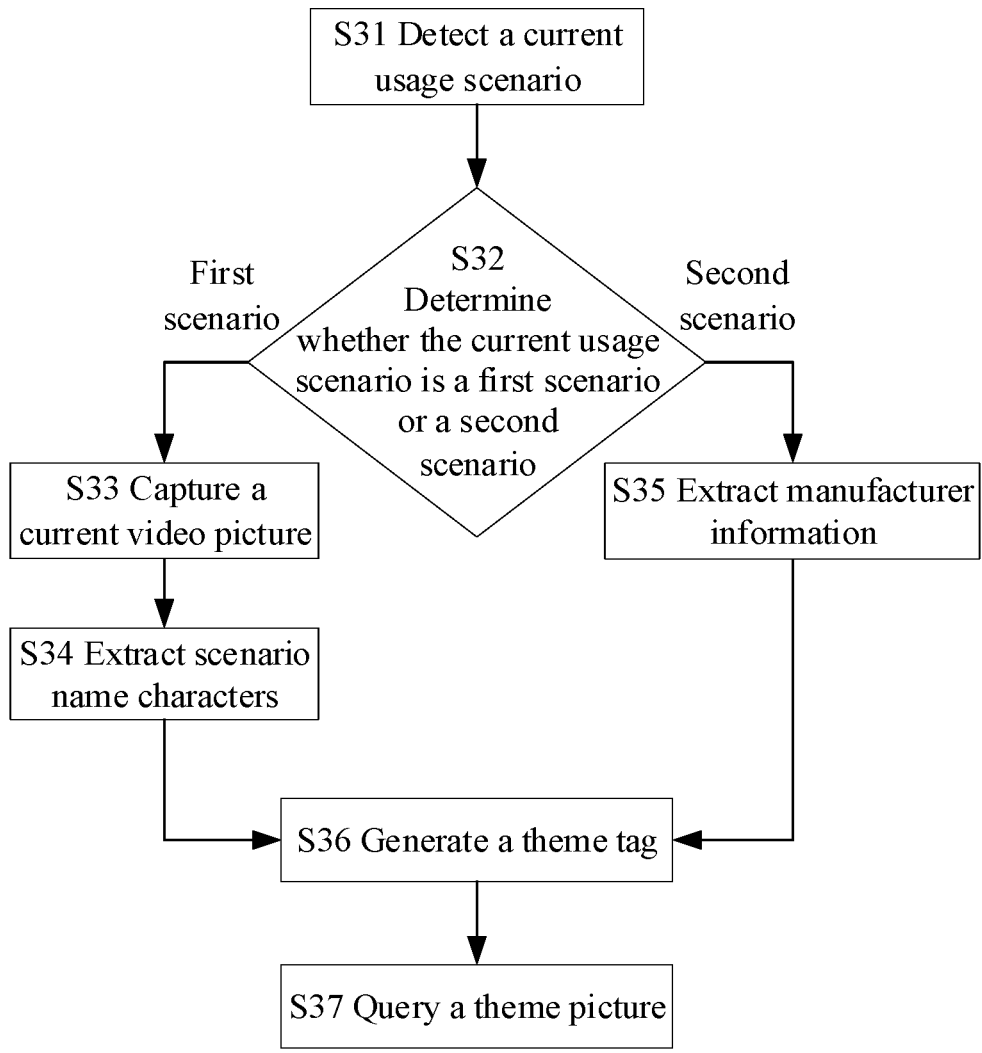
FIG. 24 is a schematic flow diagram of querying a theme picture according to a current usage scenario according to one or more embodiments of the present application.

For this, the display apparatus 200 may extract the theme pictures according to different device information, that is, as shown in FIG. 24, in some embodiments, two kinds of usage scenarios may be defined in the display apparatus 200, namely a first scenario and a second scenario. The first scenario is a usage scenario where the external device 500 has a non-fixed interface style; and the second scenario is a usage scenario where the external device 500 has a fixed interface style. If the current usage scenario is the first scenario, the display apparatus 200 captures a current video picture from the data stream, extracts one or more scene character or text from (such as, a name text) the current video picture, generates a theme tag according to the scene character or text, and finally queries a theme picture from a theme base according to the theme tag.

For example, when the gaming device is running a game A, its corresponding game interface style is a cartoon style; and when the gaming device is running a game B, its corresponding game interface style is a realistic style. As the cartoon style and the realistic style have a large difference, when the gaming device is in a game mode, the at least one processor 250 or a separate video processor of the display apparatus 200 may capture the current video picture from the data stream to generate a screenshot image. A game name or a character or a text related to the game name, such as a developer name of the game, a key word of the game, a version number and other characters or text of the game, is then read from the screenshot image by enabling a character recognition program such as optical character recognition (OCR), so that the game name is obtained. Then the display apparatus 200 generates a theme tag containing the game name "A" according to the game name and the related characters. Finally, the display apparatus 200 may query an adaptive theme picture in the theme base according to the theme tag, namely a theme picture of the cartoon style.

After the current usage scenario of the external device 500 is obtained, if the current usage scenario is the second scenario, manufacturer information of the external device is extracted from the data stream, then a theme tag is generated according to the manufacturer information, and a theme picture is queried from the theme base according to the theme tag. Typically, a main interface style of the external device 500 is set by a manufacturer when leaving the factory, the main interface style set by the same manufacturer is always matched; and thus, for a usage scenario with a fixed style, the display apparatus 200 may generate the theme tag through the manufacturer information, and query a theme picture similar to the main interface style according to the generated tag for updating the user interface theme.

Specifically, as shown in FIG. 24, the process that the display apparatus 200 queries a theme picture according to a current usage scenario includes: S31, detecting a current usage scenario; S32, determining whether the current usage scenario is a first scenario or a second scenario, in response to the current usage scenario being the first scenario, performing steps S33-S34, and in response to the current usage scenario being the second scenario, performing step S35; S33, capturing a current video picture; S34, extracting scenario name characters; S35, extracting manufacturer information; S36, generating a theme tag; S37, querying a theme picture.

For example, when the gaming device does not run a game, it is generally in a main interface, and the style of the main interface is determined by a manufacturer of the gaming device through a user interface (UI) style of an operating system in the gaming device. Therefore, when it is detected that the gaming device is in the non-game scenario, the display apparatus 200 may extract the manufacturer information of the gaming device from the device information frame or the protocol frame. For example, the manufacturer of xbox is "Microsoft", then a theme tag is generated based on "Microsoft" and matching is performed, and thus a theme picture adaptive to a main interface style of xbox is extracted in the theme base to update the user interface theme to a corresponding theme.

Figure 25:
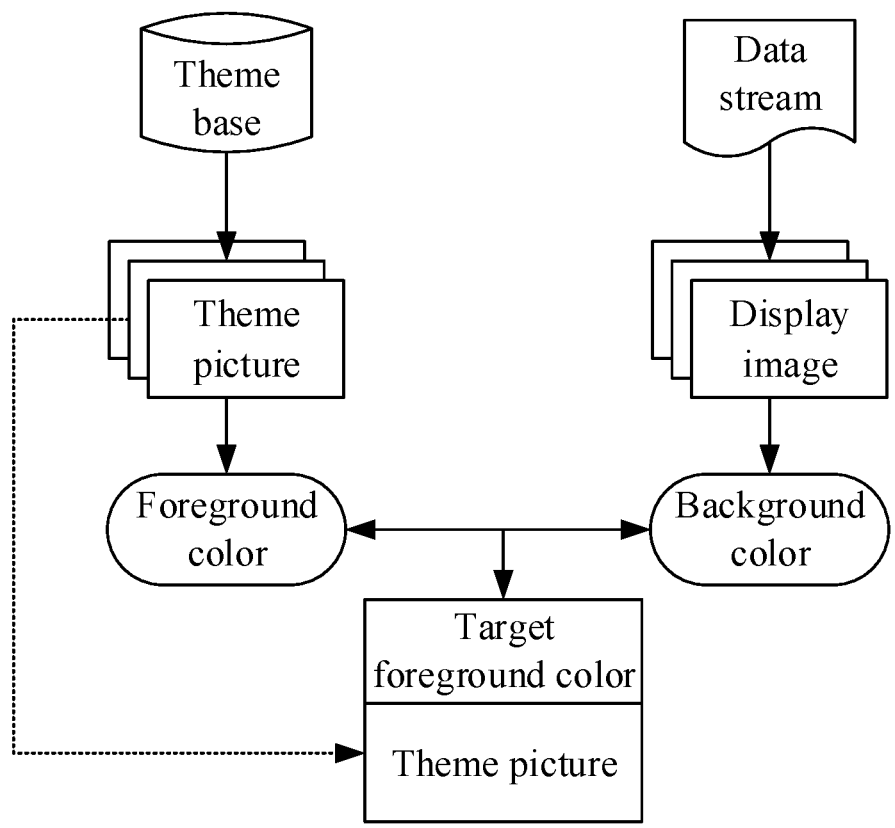
FIG. 25 is a schematic flow diagram of extracting a theme picture with a target foreground color according to one or more embodiments of the present application.

Since the same device or the same usage scenario may correspond a plurality of interface styles, for example, the main interface of the external device 500 may include a light color mode and a deep color mode to adapt to two usage time periods of daytime and night respectively. As shown in FIG. 25, the display apparatus 200 may obtain a plurality of theme pictures matching the theme tag during the step of querying the theme picture from the theme base, and each theme picture may correspondingly render a user interface theme adaptive to the current usage scenario.

Meanwhile, the display apparatus 200 may further extract multiple frames of display images from the data stream and traverse color layouts of the plurality of theme pictures and the display images respectively, to obtain a foreground color based on the theme pictures and obtain a background color based on the display images. Then, a theme picture having a target foreground color is extracted from the plurality of theme pictures by comparing the foreground color and the background color. Apparently, the target foreground color is one of a plurality of foreground colors matched in the theme base.

The target foreground color may be determined by determining whether the foreground color and the background color are adaptive. The foreground color and the background color being adaptive refers to a state that the foreground color and the background color are similar in hue style, but have a difference in specific color. For example, when the background color is a relatively cool hue formed by green, blue, purple and a combination thereof, the foreground color also adopts a relatively cool hue, but needs to be distinguished from a main color in a background pattern, so that a user can easily distinguish a control menu, which facilitates execution of an interaction operation.

It can be seen that in the above embodiments, the display apparatus 200 may determine the interface style under the current usage scenario by comparing the display images and the theme pictures, thereby finding out the matched theme picture which is consistent with the display picture in style and easy to distinguish, for updating the user interface theme.

Figure 26:
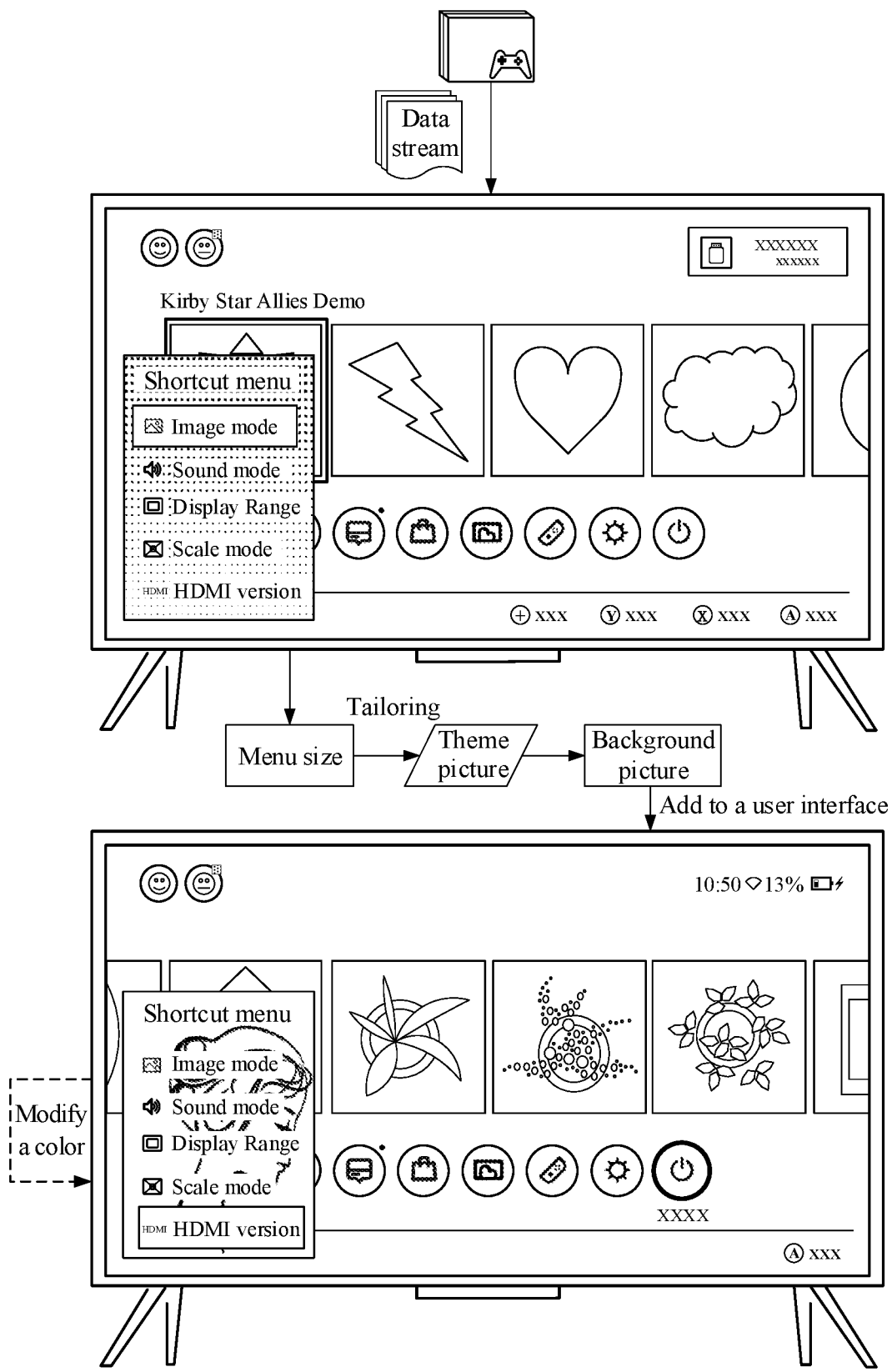
FIG. 26 is a schematic flow diagram of updating a user interface theme based on a theme picture according to one or more embodiments of the present application.

In order to update the user interface theme, as shown in FIG. 26, in some embodiments, in the process of updating the user interface theme according to the theme picture, the display apparatus 200 may first obtain a menu size of a current user interface, and then customize the theme picture (such as, tailoring the theme picture) according to the menu size to generate a background picture, thereby adding the background picture to the user interface to cause the background style of the user interface adaptive to the current usage scenario.

Meanwhile, in order to make option contents on the user interface clear and distinguishable, while the background picture is added to the user interface, the colors of text and/or icons on the user interface may be further modified according to the background picture, so that the text and icons on the user interface are more obvious compared with the background and are easy for a user to distinguish.

Based on the above embodiments, the display apparatus 200 may extract the device type and the usage scenario from the data stream and update the user interface theme according to the extracted contents, to obtain the theme style adaptive to the usage scenario of the external device 500. Apparently, the display apparatus 200 may continuously detect the usage scenario of the external device 500 according to a set frequency, so that the user interface theme changes with the change of the usage scenario, and the user experience is improved.

For example, the display apparatus 200 may realize theme change via three components, namely a middleware layer, a system framework layer and a rendering layer. The middleware layer is responsible for collecting type descriptions and working state parameters of a source device and reporting them actively or on its own initiative; the system framework (Android framework) layer captures a current video picture of the source device, extracts a game name character in a game picture and generates a theme tag; and the rendering layer (LiveTV) manufactures theme pictures of mainstream devices and games in advance according to a menu size and stores them in a local theme base. A theme picture corresponding to the tag is queried in the local theme base by detecting tag information notified by the framework layer in real time, and a user interface theme is updated.

Figure 27:
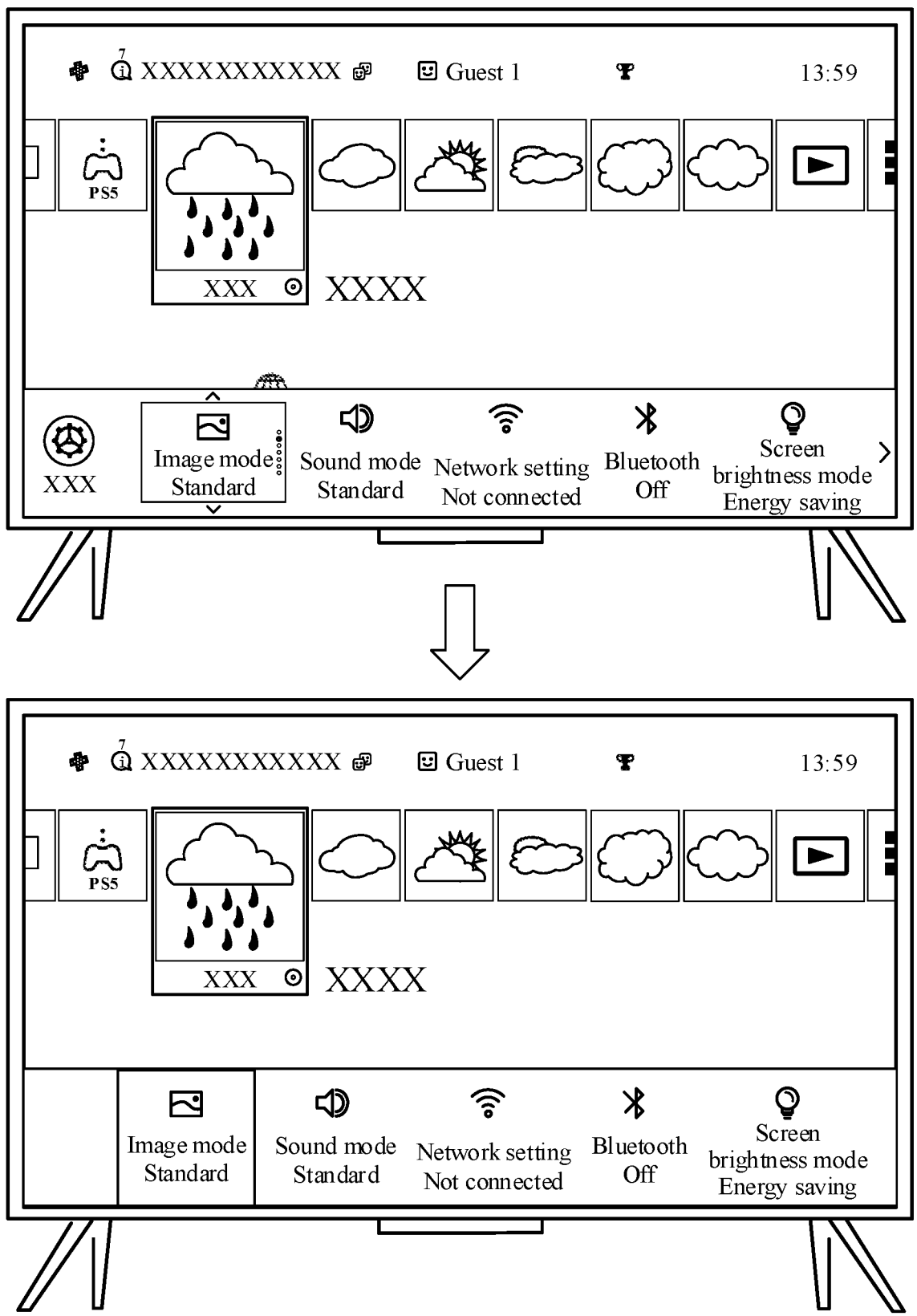
FIG. 27 is an effect comparison diagram obtained after updating a theme of a main setting interface according to one or more embodiments of the present application.
Figure 28:
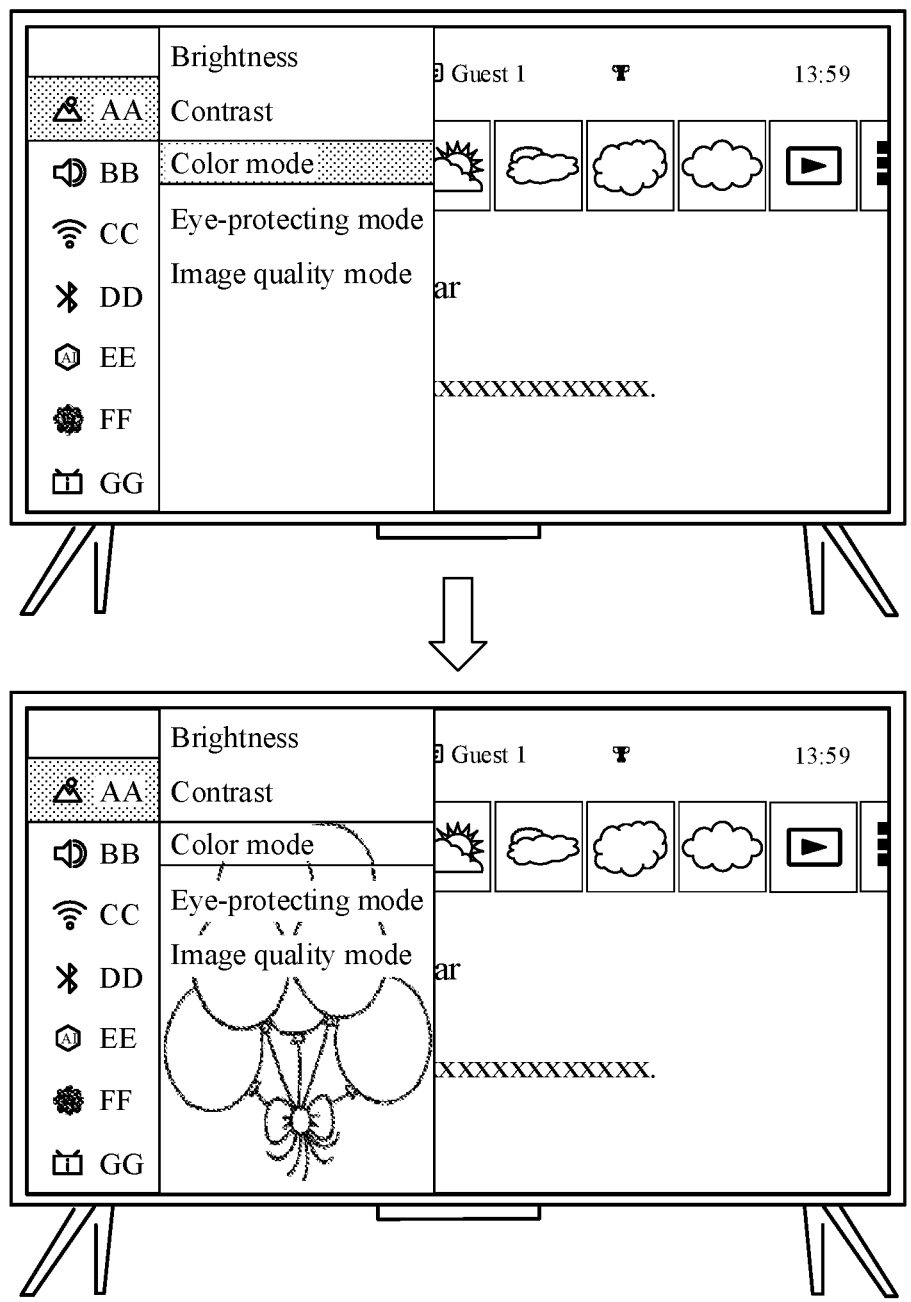
FIG. 28 is an effect comparison diagram obtained after updating a theme of a menu interface according to one or more embodiments of the present application.
Figure 29:
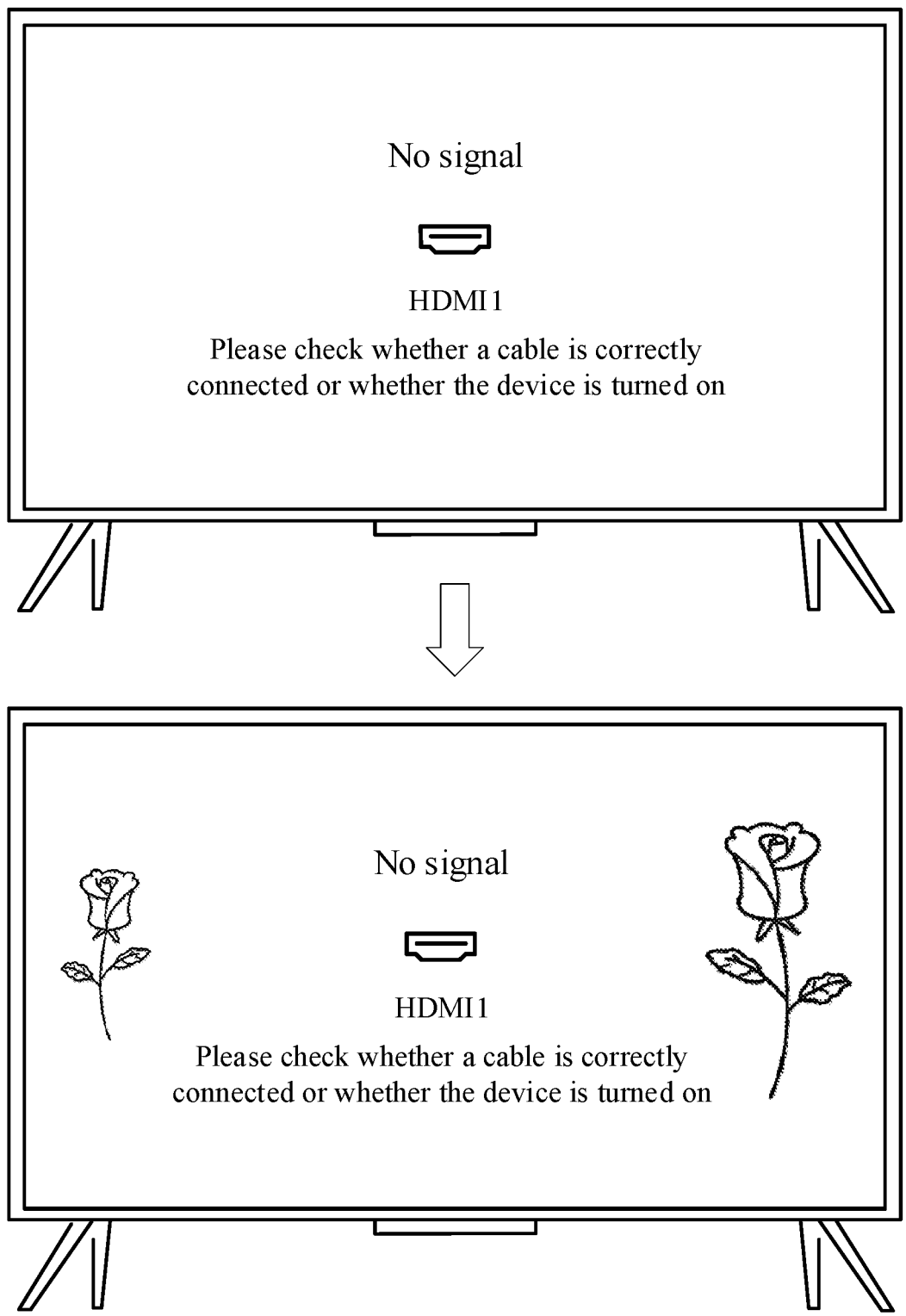
FIG. 29 is an effect comparison diagram obtained after updating a theme of a blocking interface according to one or more embodiments of the present application.

It should be noted that, in the process of updating the user interface theme, the display apparatus 200 may update all user interfaces of the display apparatus 200 or only update some control menus. For example, as shown in FIG. 27, FIG. 28 and FIG. 29, a menu with a replaceable theme mainly includes: a menu, a quick setting interface, a main setting interface, a "no signal" blocking interface, a signal source selecting interface, etc. The above interfaces are commonly used interfaces that can be called when the display apparatus 200 and the external device 500 are connected; and by updating the themes of these commonly used interfaces, a more harmonious theme style can be realized, and the data processing amount of the display apparatus 200 in a theme configuration process can also be reduced, thereby saving computing resources.

Some embodiments of the present application further provide a method for updating a user interface theme, including: receiving a data stream from an external device; extracting device information from the data stream, where the device information includes a device type and a current usage scenario of the external device; querying a theme picture in a theme base according to the device information; and updating a user interface theme according to the theme picture.

In the method for updating the user interface theme according to the embodiments, after a display apparatus 200 is connected with the external device 500, the data stream from the external device 500 may be obtained in real time. The device type and the current usage scenario are extracted from the data stream, and then the theme picture is extracted to update the user interface theme according to the theme picture. Through the method for updating the user interface theme, the user interface theme may be updated according to displayed contents in the external device 500, so that in a process of outputting data stream, the display apparatus 200 can update the theme to an interface style matching the contents of the data stream, which is convenient for a user to perform an interaction operation.

For the convenience of explanation, the above illustration is performed in combination with specific embodiments. However, the above discussion in some embodiments is not intended to be exhaustive or to limit the embodiments to the specific forms disclosed above. Based on the above teachings, various modifications and transformations can be obtained. The selection and description of the above embodiments are to better explain the principles and practical applications, so as to enable those skilled in the art to better use the embodiments and various variant embodiments suitable for specific use considerations.

What is claimed is:

1. A display apparatus, comprising:
a display, configured to display an image and/or a user interface;
one or more external device interfaces, configured to be connected with one or more external devices;
a memory, configured to store instructions and data associated with the display; and
at least one processor, configured to execute the instructions to cause the display apparatus to:
receive a data stream from the external device in connection with the display apparatus;
obtain a device information frame in the data stream, wherein the device information frame is a data frame generated by the external device according to a basic transmission protocol between the external device and the display apparatus;
traverse marker bits in the device information frame; wherein a state value of a specified marker bit in the marker bits indicates whether the external device supports an automatic control protocol between the external device and the display apparatus;

in response to the external device supporting the automatic control protocol, switch a play mode according to usage scenario information added in the data stream; and in response to the external device not supporting the automatic control protocol, switch a play mode according to a device type of the external device.

2. The display apparatus according to claim 1, wherein the play mode comprises a low-latency mode (LLM) and a high image quality mode (HIQM).

3. The display apparatus according to claim 2, wherein the at least one processor is further configured to execute the instructions to cause the display apparatus to:

in response to the external device supporting the automatic control protocol, read an auto low-latency mode (ALLM) state parameter from the data stream;

in response to the ALLM state parameter being a first value, switch the play mode to the LLM; and in response to the ALLM state parameter being a second value different from the first value, switch the play mode to the HIQM.

4. The display apparatus according to claim 1, wherein the at least one processor is further configured to execute the instructions to cause the display apparatus to:

in response to the external device supporting the automatic control protocol, obtain the device type of the external device from the data stream;

in response to the device type being a single-mode device, switch the play mode into a mode supported by the single-mode device; and in response to the device type being a multi-mode device, configure an extension protocol and switch the play mode according to the extension protocol; wherein the extension protocol is configured to transfer the usage scenario information of the external device.

5. The display apparatus according to claim 4, wherein the at least one processor is further configured to execute the instructions to cause the display apparatus to:

in response to the device type being the multi-mode device, periodically obtain protocol frame data;

traverse parameter values in a plurality of bits in the protocol frame data;

read current usage scenario information according to a combination of the parameter values in the plurality of bits; and set the play mode to a mode which adapts to the current usage scenario information.

6. The display apparatus according to claim 1, wherein the mode which adapts to the current usage scenario information comprises a complete LLM and a non-complete LLM.

7. The display apparatus according to claim 6, wherein the at least one processor is further configured to execute the instructions to cause the display apparatus to:

in response to the mode which adapts to the current usage scenario information being the complete LLM, shut down all image quality processing options for the data stream; and in response to the mode which adapts to the current usage scenario information being the non-complete LLM, shut down all image quality processing options other than a specified image quality processing option for the data stream.

8. The display apparatus according to claim 1, wherein the at least one processor is further configured to execute the instructions to cause the display apparatus to:

in response to the external device not supporting the automatic control protocol, obtain the device type of the external device according to data of a specified bit in the device information frame;

in response to the device type being a first type of device, set the play mode being LLM; and in response to the device type being a second type of device, set the play mode being HIQM.

9. The display apparatus according to claim 1, wherein the at least one processor is further configured to execute the instructions to cause the display apparatus to:

in response to the external device being connected with the external device interface for a first time, obtain scenario switching information of the external device within a detection period and parameter change information of automatic control protocol marker bits in the data stream;

in response to the scenario switching information matching the parameter change information, generate control protocol supporting information for indicating that the external device supports the automatic control protocol; and store the control protocol supporting information.

10. A processing method in a display apparatus, comprising:

receiving a data stream from an external device in connection with the display apparatus;

obtaining a device information frame in the data stream, wherein the device information frame is a data frame generated by the external device according to a basic transmission protocol between the external device and the display apparatus;

traversing marker bits in the device information frame; wherein a state value of a specified marker bit in the marker bits indicates whether the external device supports an automatic control protocol between the external device and the display apparatus;

in response to the external device supporting the automatic control protocol, switching a play mode according to usage scenario information added in the data stream;

in response to the external device not supporting the automatic control protocol, switching a play mode according to a device type of the external device.

11. The method according to claim 10, wherein the play mode comprises a low-latency mode (LLM) and a high image quality mode (HIQM).

12. The method according to claim 11, further comprising:

in response to the external device supporting the automatic control protocol, reading an auto low-latency mode (ALLM) state parameter from the data stream;

in response to the ALLM state parameter being a first value, switching the play mode to the LLM; and in response to the ALLM state parameter being a second value that is different from the first value, switching the play mode to the HIQM.

13. The method according to claim 10, further comprising:

in response to the external device supporting the automatic control protocol, obtaining the device type of the external device from the data stream;

in response to the device type being a single-mode device, switching the play mode into a mode supported by the single-mode device; and in response to the device type being a multi-mode device, configuring an extension protocol and switch the play mode according to the extension protocol; wherein the extension protocol is configured to transfer the usage scenario information of the external device.

14. The method according to claim 13, further comprising:
   in response to the device type being the multi-mode device, periodically obtaining protocol frame data;
   traversing parameter values in a plurality of bits in the protocol frame data;
   reading current usage scenario information according to a combination of the parameter values in the plurality of bits; and
   setting the play mode to a mode which adapts to the current usage scenario information.

15. The method according to claim 10, wherein the mode which adapts to the current usage scenario information comprises a complete LLM and a non-complete LLM.

16. The method according to claim 15, further comprising:
   in response to the mode which adapts to the current usage scenario information being the complete LLM, shutting down all image quality processing options for the data stream; and
   in response to the mode which adapts to the current usage scenario information being the non-complete LLM, shutting down all image quality processing options other than a specified image quality processing option for the data stream.

17. The method according to claim 10, further comprising:
   in response to the external device not supporting the automatic control protocol, obtaining the device type of the external device according to data of a specified bit in the device information frame;
   in response to the device type being a first type of device, setting the play mode being an LLM; and
   in response to the device type being a second type of device, setting the play mode being an HIQM.

18. The method according to claim 10, further comprising:
   in response to the external device being connected with an external device interface for a first time, obtaining scenario switching information of the external device within a detection period and parameter change information of automatic control protocol marker bits in the data stream;
   in response to the scenario switching information matching the parameter change information, generating control protocol supporting information for indicating that the external device supports the automatic control protocol; and
   storing the control protocol supporting information.

* * * * *